(12) United States Patent
Harada

(10) Patent No.: US 11,544,840 B2
(45) Date of Patent: Jan. 3, 2023

(54) INSPECTION DEVICE, INSPECTION METHOD, AND RECORDING MEDIUM

(71) Applicant: Konica Minolta, Inc., Tokyo (JP)

(72) Inventor: Kazuki Harada, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 256 days.

(21) Appl. No.: 16/825,111

(22) Filed: Mar. 20, 2020

(65) Prior Publication Data

US 2020/0311896 A1  Oct. 1, 2020

(30) Foreign Application Priority Data

Mar. 29, 2019 (JP) .............................. JP2019-065636

(51) Int. Cl.
 *G06T 7/00* (2017.01)
 *G06T 1/20* (2006.01)

(52) U.S. Cl.
 CPC ................ *G06T 7/001* (2013.01); *G06T 1/20* (2013.01)

(58) Field of Classification Search
 None
 See application file for complete search history.

(56) References Cited

U.S. PATENT DOCUMENTS

| | | | | |
|---|---|---|---|---|
| 9,898,814 B2 * | 2/2018 | Kitai | .................... | G06K 15/027 |
| 10,063,838 B2 * | 8/2018 | Segawa | ................ | H04N 13/239 |
| 2001/0053245 A1 * | 12/2001 | Sakai | ....................... | G06T 7/32 |
| | | | | 382/218 |
| 2002/0154829 A1 * | 10/2002 | Tsukioka | ........... | H04N 5/23254 |
| | | | | 382/254 |
| 2007/0133863 A1 * | 6/2007 | Sakai | ............... | G01N 21/95607 |
| | | | | 382/151 |
| 2007/0184373 A1 * | 8/2007 | Mertens | ................ | G06T 7/0004 |
| | | | | 430/65 |
| 2008/0100879 A1 * | 5/2008 | Lee | ......................... | H04N 1/401 |
| | | | | 358/461 |
| 2014/0270397 A1 * | 9/2014 | Sochi | ...................... | G06T 7/001 |
| | | | | 382/112 |
| 2016/0275664 A1 * | 9/2016 | Kitai | .................... | G06K 15/027 |

(Continued)

FOREIGN PATENT DOCUMENTS

| | | |
|---|---|---|
| JP | 2009-140155 | 6/2009 |
| JP | 2009-223804 | 10/2009 |

(Continued)

OTHER PUBLICATIONS

Japan Patent Application No. 2019-065636; Notice of Reasons for Refusal; dated Nov. 8, 2022; 9 pages.

*Primary Examiner* — Anand P Bhatnagar
(74) *Attorney, Agent, or Firm* — BakerHostetler

(57) ABSTRACT

An inspection device that inspects eligibility of a subject image, the inspection device including a hardware processor and a recording medium including instructions that when executed by the hardware processor cause the inspection device to: acquire the subject image and a reference image corresponding to the subject image; acquire a judgment criterion indicating a range of eligibility for differences between images; detect a difference between the subject image and the reference image; and when the difference is detected, judge eligibility of the subject image by determining whether or not the difference is included in the range indicated by the judgment criterion.

13 Claims, 19 Drawing Sheets

(56) References Cited

U.S. PATENT DOCUMENTS

2019/0392654 A1\* 12/2019 Sato .................. G07C 1/10
2021/0073520 A1\* 3/2021 Hassan ............... G06V 40/172

FOREIGN PATENT DOCUMENTS

| JP | 2010-020562 | | 1/2010 |
| JP | 2012-038162 | | 2/2012 |
| JP | 2012-043062 | | 3/2012 |
| JP | 2015-181049 | A | 10/2015 |
| JP | 2017-138715 | A | 8/2017 |

\* cited by examiner

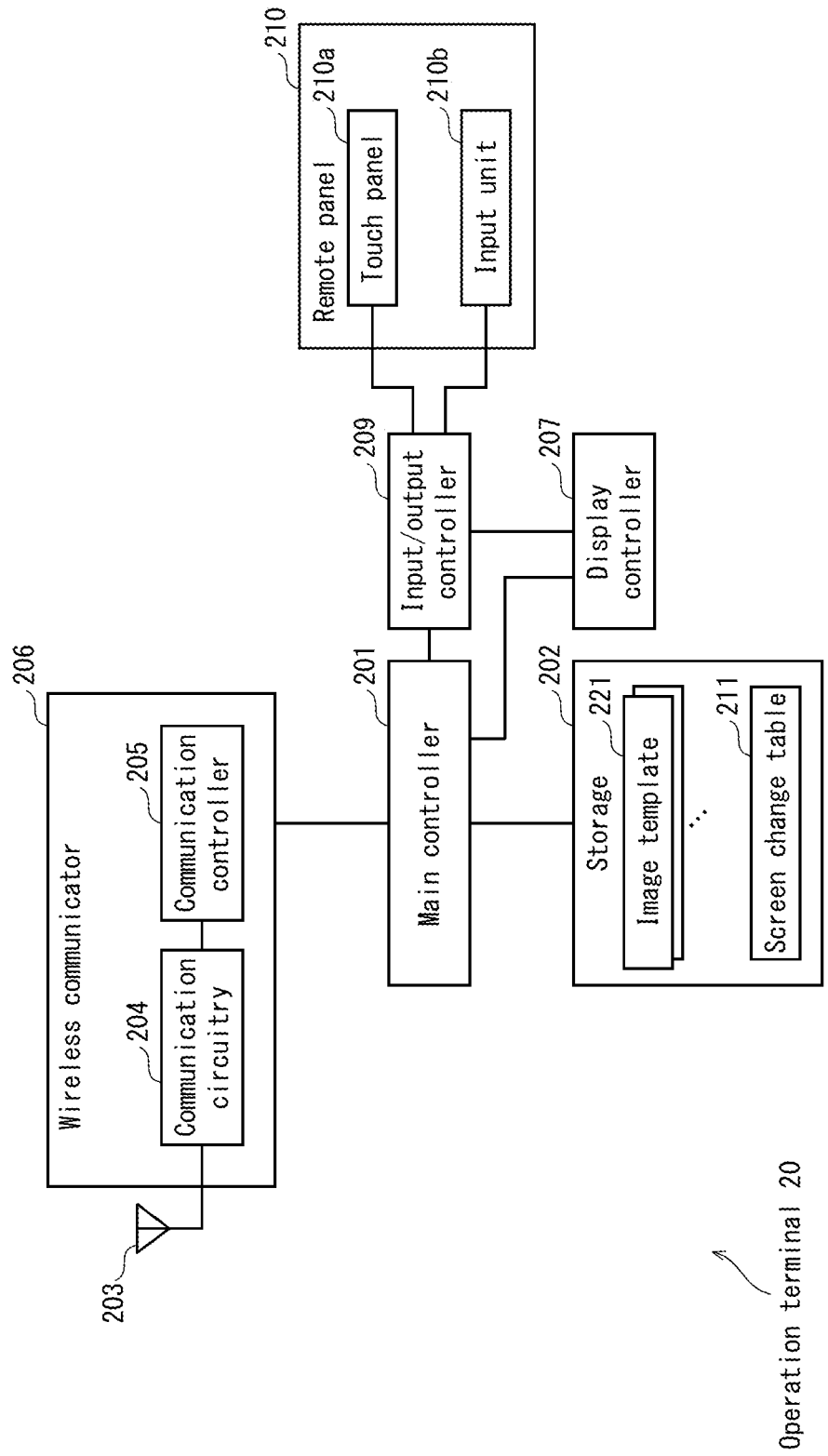

Screen change table

| Screen ID | Screen change information | | |
|---|---|---|---|
| | Option information | | |
| | Option ID | Destination screen ID | Function |
| M001 | S00101 | – | Brightness setting |
| | S00102 | – | Sheet setting |
| | S00103 | – | Zoom setting |
| | S00104 | – | Page aggregation setting |
| | S00105 | M002 | Change to preview screen |
| M002 | S00201 | – | Sheet setting |
| | S00202 | – | Zoom setting |
| | S00203 | – | Resolution setting |
| | S00204 | – | Execute re-scan |
| ⋮ | ⋮ | ⋮ | ⋮ |

FIG. 7

|  | Judgment criteria settings | 341 |
|---|---|---|
|  | Copy function: preview screen | 342a 342b 342c |
| 342 — | Preview region | ■Weak □Medium □Strong |
| 343 — | Menu region |  |
| 344 — | First field | □Weak ■Medium □Strong |
|  | Second field | □Weak ■Medium □Strong |
|  | Third field | □Weak ■Medium □Strong |
|  | Fourth field | ■Weak □Medium □Strong |
| 345 — | Important region |  |
| 346 — | Shift in optical code image | ■Weak □Medium □Strong |
| 347 — | Difference in optical code image | □Weak □Medium ■Strong |

FIG. 8

|  | Judgment criteria settings | 351 |
|---|---|---|
|  | Copy function: preview screen | 352a 352b 352c |
| 352 — | Preview region | ■Weak □Medium □Strong |
| 353 — | Menu region | □Weak ■Medium □Strong |
| 354 — | Important region | □Weak □Medium ■Strong |

FIG. 10

Test case DB 421

| Screen ID 423 | Screen name 424 | Test information 422 | | | | | |
|---|---|---|---|---|---|---|---|
| | | Region information 425 | | Small item information 425c | | | Test content 428 |
| | | Region name 425a | Region coordinates 425b 426 | Small item region name | Small item region coordinates 427 | | |
| 001 | Preview screen | Preview region | (x1, y1), (x2, y2) | — | (x11, y11), (x12, y12) | | Shift in preview screen |
| | | Menu region | (x3, y3), (x4, y4) | First field | (x13, y13), (x14, y14) | | Shift in field |
| | | | | Second field | (x15, y15), (x16, y16) | | Shift in field |
| | | | | Third field | (x17, y17), (x18, y18) | | Shift in field |
| | | | | Fourth field | (x19, y19), (x20, y20) | | Shift in field |
| | | Important region | (x5, y5), (x6, y6) | Optical code | (x21, y21), (x22, y22) | | Shift in optical code image |
| | | | | | | | Difference in optical code image |
| ... | ... | ... | ... | ... | ... | | ... |

FIG. 11

Judgment criteria DB 431

| Screen ID | Screen name | Judgment criteria information |||
|---|---|---|---|---|
| | | Region name | Region information ||
| | | | Small item region information | |
| | | | Small item region name | Intensity |
| 001 | Preview screen | Preview region | Preview image | Weak |
| | | Menu region | First field | Medium |
| | | | Second field | Medium |
| | | | Third field | Medium |
| | | | Fourth field | Weak |
| | | Important region | Optical code | Medium |
| | | | | Strong |
| ⋮ | ⋮ | ⋮ | ⋮ | ⋮ |

FIG. 12

Judgment criteria DB 431a

| Screen ID | Screen name | Judgment criteria information |||
|---|---|---|---|---|
| | | Region name | Region information ||
| | | | Small item region information | |
| | | | Small item region name | Intensity |
| 001 | Preview screen | Preview region | – | Weak |
| | | Menu region | – | Medium |
| | | Important region | – | Strong |
| ⋮ | ⋮ | ⋮ | ⋮ | ⋮ |

FIG. 13

Evaluation results DB (441)

Evaluation results information:

| Screen ID | Screen name | Region information | | | Judgment result |
|---|---|---|---|---|---|
| | | Region name | Small item region information | | |
| | | | Small item region name | | |
| 001 | Preview screen | Preview region | Preview image | | OK |
| | | Menu region | First field | | NG |
| | | | Second field | | NG |
| | | | Third field | | NG |
| | | | Fourth field | | NG |
| | | Important region | Optical code | | OK |
| | | | | | NG |
| ⋮ | ⋮ | ⋮ | ⋮ | | ⋮ |

FIG. 14

Evaluation results DB (441a)

Evaluation results information:

| Screen ID | Screen name | Region name | Small item region name | Judgment result | Evaluation result |
|---|---|---|---|---|---|
| 001 | Preview screen | Preview region | Preview image | OK | NG |
| | | Menu region | First field | NG | OK |
| | | | Second field | NG | OK |
| | | | Third field | NG | OK |
| | | | Fourth field | NG | OK |
| | | Important region | Optical code | OK | – |
| | | | | NG | – |
| ⋮ | ⋮ | ⋮ | ⋮ | ⋮ | ⋮ |

Reference screen

| | Intensity | Judgment condition (permissible range) | | Satisfied | Not satisfied | |
|---|---|---|---|---|---|---|
| 492a | Strong (100) | $1-\dfrac{A}{X}=1$ | $\left(\dfrac{A}{X}=0\right)$ | OK | NG | 495a / 496a |
| 492b | Medium (80) | $1-\dfrac{A}{X}\geqq 0.8$ | $\left(0.2\geqq\dfrac{A}{X}\right)$ | OK | NG | 495b / 496b |
| 492c | Weak (60) | $1-\dfrac{A}{X}\geqq 0.6$ | $\left(0.4\geqq\dfrac{A}{X}\right)$ | OK | NG | 495c / 496c |
| 492d | — | $0.6>1-\dfrac{A}{X}$ | $\left(\dfrac{A}{X}>0.4\right)$ | NG | — | 495d |

INSPECTION DEVICE, INSPECTION METHOD, AND RECORDING MEDIUM

This application claims priority to Japanese Patent Application No. 2019-065636 filed Mar. 29, 2019, the contents of which are hereby incorporated herein by reference in their entirety.

BACKGROUND

Technical Field

The present disclosure relates to techniques for inspecting eligibility of screens displayed on electronic devices.

Background Art

Conventionally, electronic devices generate and display images in order to guide users through operation methods.

According to JP 2012-43062, JP 2012-38162, JP 4859821, and JP 2009-223804, in order to inspect accuracy of an image displayed on an electronic device, an inspection device compares a reference image prepared in advance to a displayed image. By automating the image comparison, the labor required for manual inspection is reduced, and inspection time is shortened.

SUMMARY

However, according to the inspection methods described in JP 2012-43062, JP 2012-38162, JP 4859821, and JP 2009-223804, even minor differences that a user would not consider to be problems are detected, and therefore it is necessary to check whether the detected differences are significant. Thus, there is a problem in that manual labor is required and inspection time increases.

In order to solve this problem, the present disclosure aims to provide an inspection device, an inspection method, and a non-volatile recording medium on which a computer program is recorded that can reduce the number of steps for confirming whether or not a detected difference is significant, taking advantage of automation of inspection of image eligibility.

To achieve at least one of the abovementioned objects, according to an aspect of the present disclosure, an inspection device reflecting one aspect of the present disclosure is an inspection device that inspects eligibility of a subject image, the inspection device comprising: a hardware processor and a non-transitory computer-readable recording medium comprising computer-executable instructions that when executed by the hardware processor are configured to cause the inspection device to: acquire the subject image and a reference image corresponding to the subject image; acquire a judgment criterion indicating a range of eligibility for differences between images; detect a difference between the subject image and the reference image; and when the difference is detected, judge eligibility of the subject image by determining whether or not the difference is included in the range indicated by the judgment criterion.

BRIEF DESCRIPTION OF DRAWINGS

The advantages and features provided by one or more embodiments of the disclosure will become more fully understood from the detailed description given hereinbelow and the appended drawings which are given by way of illustration only, and thus are not intended as a definition of the limits of the invention. In the drawings:

FIG. 2 is a block diagram illustrating structure of an operation terminal 20;

FIG. 7 illustrates a settings screen 341 for setting judgment criteria;

FIG. 8 illustrates a settings screen 351 for setting judgment criteria;

FIG. 10 illustrates a data structure of a test case database (DB) 421;

FIG. 11 illustrates a data structure of a judgment criteria DB 431 set for each function;

FIG. 12 illustrates a data structure of a judgment criteria DB 431a set for each region;

FIG. 13 illustrates a data structure of an evaluation results DB 441;

FIG. 14 illustrates a data structure of an evaluation results DB 441a to which evaluation results are added;

DETAILED DESCRIPTION

1. Embodiments

A test system 1 as an embodiment of the present disclosure is described with reference to the drawings. However, the scope of the invention is not limited to the disclosed embodiments.

1.1. Test System 1

Figure 1:
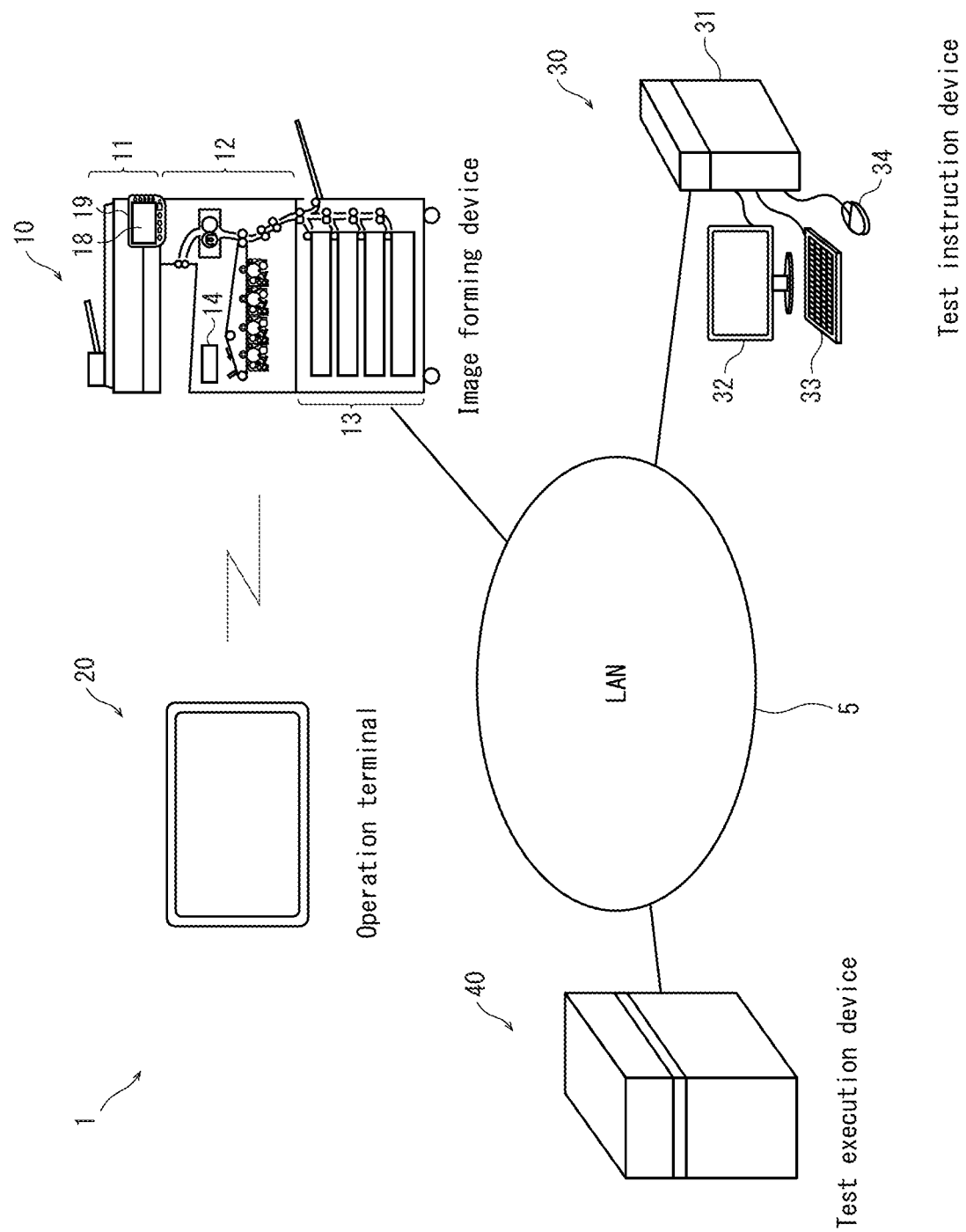
FIG. 1 is a system structure diagram illustrating structure of a test system 1 pertaining to an embodiment.

As illustrated in FIG. 1, the test system 1 includes an image forming device 10 (electronic device), an operation terminal 20, a test instruction device 30, and a test execution device 40 (inspection device).

The image forming device 10, the test instruction device 30, and the test execution device 40 are connected to a local area network (LAN) 5. Further, the image forming device 10 and the operation terminal 20 communicate with each other by short-range wireless system.

The image forming device 10 receives operation instructions from the operation terminal 20 via the short-range wireless system, and displays a screen according to a received operation instruction. The image forming device 10 transmits subject screen data (a subject image) in which pixel values are arranged in a matrix and that is a basis for screen display to the test execution device 40. The test execution device 40 receives the subject screen data and stores the received subject screen data.

Figure 9:
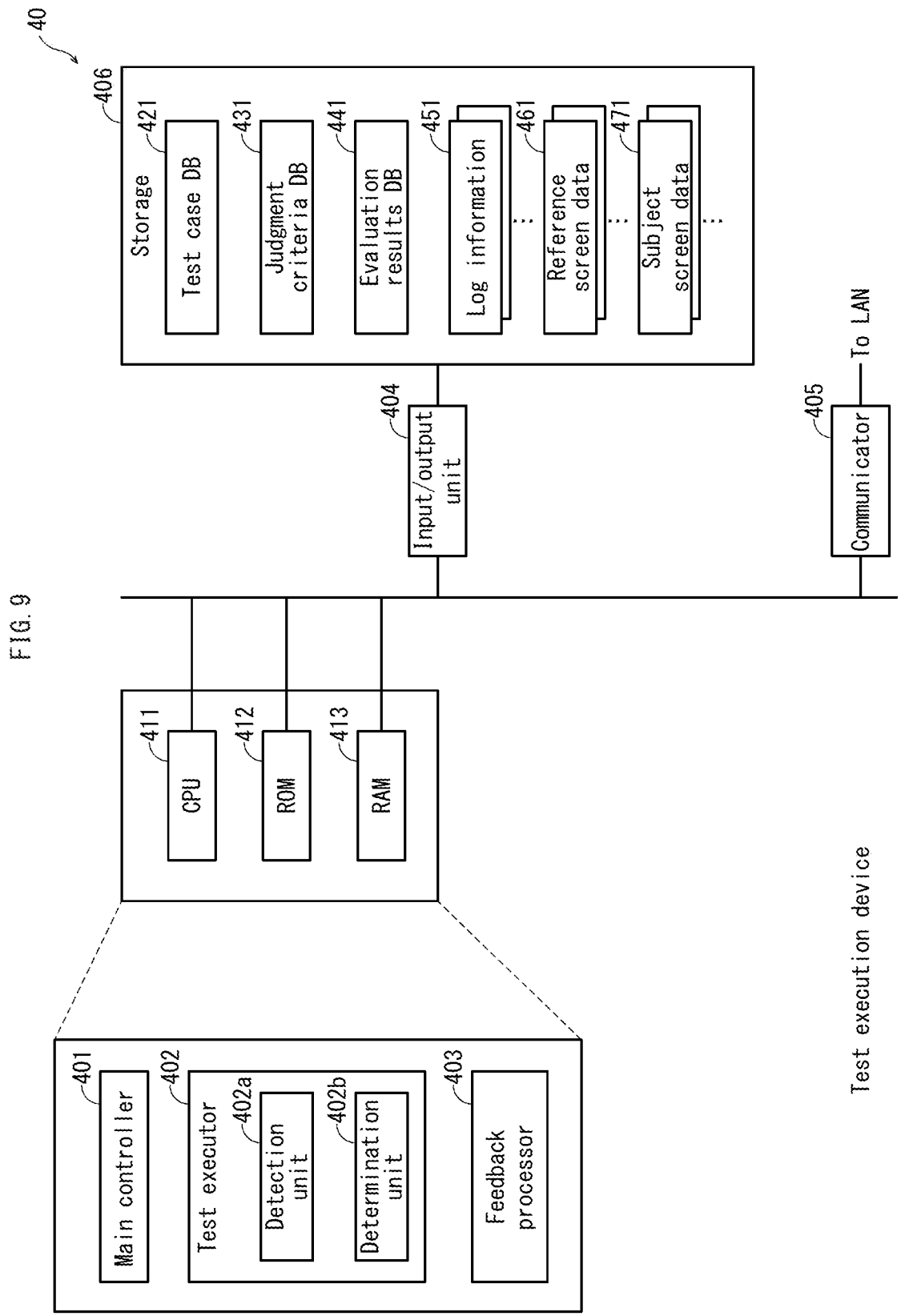
FIG. 9 is a block diagram illustrating structure of a test execution device 40.

The test instruction device 30 receives judgment criteria from a user, used for testing eligibility of an image displayed on the image forming device 10, and transmits received judgment criteria to the test execution device 40. The test execution device 40 receives the judgment criteria and writes the received judgment criteria to the judgment criteria database (DB) 431 (FIG. 9).

The test execution device 40, according to a test start instruction received from the test instruction device 30, compares the subject screen data to reference screen data corresponding to the subject screen data. Here, screen size of the subject screen data and screen size of the reference screen data may be the same, and may be different. When there is any difference between the subject screen data and the reference screen data, the test execution device 40 judges eligibility of the subject screen data by using the judgment criteria DB 431. The test execution device 40 writes judgment results ("OK" or "NG") to the evaluation results DB 441 (FIG. 9).

The test instruction device 30 receives the evaluation results DB 441 from the test execution device 40 and displays the evaluation results DB 441. A user (evaluator) of the test instruction device 30 judges whether or not displayed judgment results included in the evaluation results DB 441 are reasonable. If the evaluator judges that the judgment results are not reasonable, the evaluator operates the test instruction device 30 to write a negative evaluation result ("NG") to the evaluation results DB 331. On the other hand, if the evaluator judges that the judgment results are reasonable, the evaluator may operate the test instruction device 30 to write a positive evaluation result ("OK") to the evaluation results DB 331.

For example, if a judgment criterion is initially set to "strong" for a test of an input field included in subject screen data, a judgment result is "no good" (NG), and the difference between the subject screen data and the reference data is only a slight shift in a display position of the input field, the evaluator may judge that the evaluation result is actually OK and write the evaluation result of "OK" to the evaluation results DB 331.

On the other hand, if a judgment criterion is initially set to "medium" for a test of content of an optical reading code included in subject screen data, a judgment result is OK, and the difference between the subject screen data depends on content of an optical reading code, the evaluator writes the evaluation result "NG" to the evaluation results DB 331.

The test instruction device 30 sends the evaluation results DB 331 in which the evaluation results are written to the test execution device 40, and the test execution device 40 stores the received evaluation results DB.

The test execution device 40 corrects the judgment criteria in the judgment criteria DB 431 when a judgment result in the evaluation results DB is corrected by an evaluation result, i.e., when a judgment result is "OK" but an evaluation result is "NG", or a judgment result is "NG" but an evaluation result is "OK".

The test execution device 40 uses the corrected judgment criteria in the judgment criteria DB 431 to execute testing of the subject screen data again.

1.2. Operation Terminal 20

As illustrated in FIG. 2, for example, the operation terminal 20 includes a main controller 201, a storage 202, an antenna 203, a wireless communicator 206, a display controller 207, an input/output controller 209, and a remote panel 210. The wireless communicator 206 includes communication circuitry 204 and a communication controller 205. The remote panel 210 includes a touch panel 210a and an input unit 210b.

More specifically, the operation terminal 20 is a computer system including a microprocessor, a signal processor, read-only memory (ROM), random access memory (RAM), and the like. The RAM stores a computer program.

The microprocessor includes, for example, a fetch unit, a decoding unit, an execution unit, a register file, an instruction counter, and the like. The fetch unit fetches instruction codes included in a computer program stored in memory one at a time. The decoding unit decodes fetched instruction codes. The execution unit executes instructions according to decoding results.

Here, a computer program is composed of a combination of instruction codes indicating commands for a computer to achieve defined functions.

The microprocessor and the signal processor operate according to a computer program. Thus, the main controller 201, the communication controller 205, the display controller 207, and the input/output controller 209 achieve their respective functions.

As one example, the operation terminal 20 is a tablet computer. The operation terminal 20 may be a smartphone, a mobile phone, a portable personal computer (PC), or the like.

The operation terminal 20 may operate in a normal mode or an emulation mode depending on a user instruction.

In the emulation mode, the operation terminal 20 emulates a display function and an input function of the operation panel 19 of the image forming device 10 (FIG. 1). In other words, a user's operation of the operation terminal 20 is equivalent to a user's direct operation of the operation panel 19, and the operation panel 19 synchronizes with the operation terminal 20 to display an equivalent screen. The image forming device 10 changes a screen displayed on the operation panel 19 according to a remote operation from the operation terminal 20, and the screen displayed on the operation panel 19 due to the change is output to the test execution device 40 as subject screen data. Further, in this case, the image forming device 10 only changes the screen displayed on the operation panel 19, and does not execute a job such as a print job or copy job.

On the other hand, in the normal mode, the operation terminal 20 acts in the same way as the operation panel 19 of the image forming device 10. That is, the image forming device 10 executes a job such as a print job or copy job according to a remote operation from the operation terminal 20.

(1) Storage 202

The storage 202 includes, for example, a nonvolatile semiconductor memory, but the storage 202 may be a hard disk drive.

The storage 202, as illustrated in FIG. 2, stores screen templates 221, a screen change table 211, and the like. Further, the storage 202 stores a screen identity (ID) that identifies a screen to be displayed at a start of emulation.

(Screen Templates 221)

The screen templates 221 are each a template image that is a basis for generating a screen displayed on the touch panel 210a. Each screen template is identified by a screen ID. The screen ID for a given screen template is identical to a screen ID that identifies a screen generated based on the given screen template.

(Screen Change Table 211)

The screen change table 211 is a data table used for controlling changes of screens displayed on the touch panel 210a.

Figures 3A, 3B:
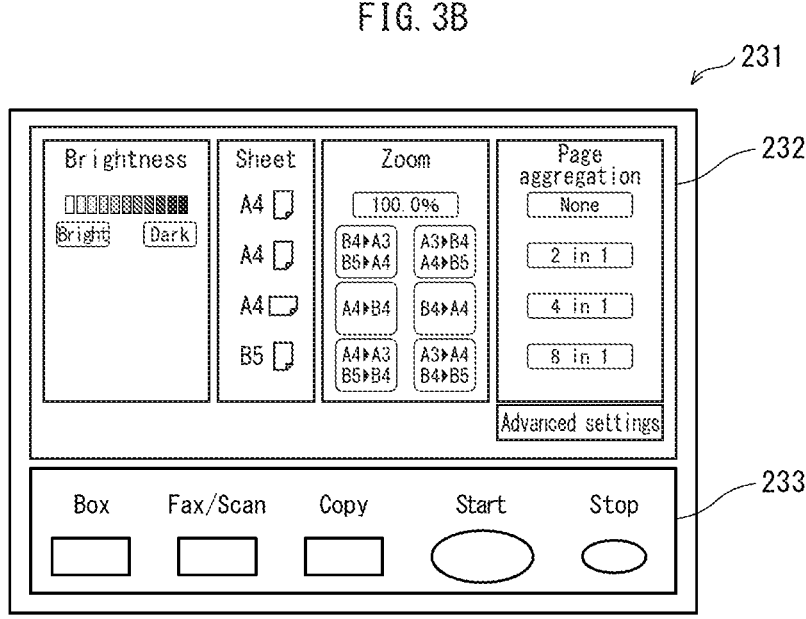
FIG. 3A illustrates a data structure of a screen change table 211.
FIG. 3B illustrates a screen 231 displayed on the operation terminal 20.

The screen change table 211, as illustrated in FIG. 3A, stores screen change information 212. Each entry of the screen change information 212 corresponds to one screen.

Each entry of the screen change information 212 includes one screen ID 213 and one or more entries for option information 214.

The screen ID 213 is an identifier for uniquely identifying a screen.

Each entry of the option information 214 corresponds to one option displayed on a screen.

Thus, when a plurality of entries of the option information 214 are included in one entry of the screen change information 212, the same number of options as the number of entries of the option information 214 are displayed on a screen, and each entry of the option information 212 in the one entry of the screen change information 214 corresponds to an option included in the screen.

Each entry of the option information 214 may include an option ID 215, a destination screen ID 216, and a function 217, or may include only the option ID 215 and the function 217 without the destination screen ID 216.

The option ID 215 is an identifier that uniquely identifies the corresponding option.

When the option information 214 includes the destination screen ID 216 and an option identified by the option ID 215 on screen is selected by a user, a screen change occurs to display a new screen. The destination screen ID 216 is a screen ID identifying the next screen to be displayed when the option identified by the option ID 215 is selected by a user.

When the option information 214 does not include the destination screen ID 216, no screen change occurs even if an option identified by the option ID 215 on screen is selected by a user. In other words, there is no screen to be displayed next.

The function 217 indicates a function to be executed when the option identified by the option ID 215 is selected by a user. More specifically, "change to preview screen" indicates a change to a preview screen to be displayed next. Further, "concentration setting", "paper setting", "magnification setting", "page aggregation setting", etc., indicate settings for concentration, paper, magnification, page aggregation, etc., which are parameters of job execution conditions that can be set by a user and stored.

(2) Wireless Communicator 206 and Antenna 203

The communication circuitry 204 and the communication controller 205 included in the wireless communicator 206, and the antenna 203 perform short-range wireless communication based on a wireless LAN standard such as IEEE 802.11a, IEEE 802.11b, IEEE 802.11n, IEEE 802.11ac, or the like.

The antenna 203 is connected to the communication circuitry 204, and transmits and receives signals wirelessly to and from other devices equipped with a short-range wireless communication function, such as the image forming device 10. The communication circuitry 204 performs frequency selection, frequency conversion, and the like on signals transmitted and received by the antenna 203. The communication controller 205 demodulates a signal received from the communication circuitry 204, and outputs to the main controller 201. Further, the communication controller 205 modulates a signal received from the main controller 201, and outputs to the communication circuitry 204.

(3) Remote Panel 210 and Input/Output Controller 209

The touch panel 210a, which is part of the remote panel 210, includes a display panel that has a rectangular display face and a touch pad attached to the display face. The display panel is, for example, a liquid crystal display. The touch pad detects contact of an operator such as a user's finger contacting an operation surface of the touch panel 210a.

The display panel displays icons for operation. Further, the display panel receives from the display controller 207 a screen for operation of the image forming device 10, and displays the received screen.

An example of a screen displayed by the display panel is illustrated in FIG. 3B.

In FIG. 3B, a screen 231 is displayed when the operation terminal 20 operates in the emulation mode. The screen 231 includes an operation panel region 232 corresponding to a screen to be displayed on the operation panel 19 of the image forming device 10, and a button region 233 displaying button images each imitating a button of the operation panel 19.

In the normal mode, the touch pad of the touch panel 210a receives from a user an acquisition instruction indicating acquisition of subject screen data, and outputs the received acquisition instruction to the main controller 201 via the input/output controller 209. Here, an acquisition instruction means starting emulation mode. Further, in the emulation mode, the touch pad receives a user operation and outputs content of the received operation to the display controller 207 via the input/output controller 209.

The input unit 210b includes buttons. Each button is operated by being pressed by a user.

The input/output controller 209 receives an operation signal from the input unit 210b as an input signal. Further, the input/output controller 209 receives position information from the touch panel 210a as an input signal. The input/output controller 209 outputs a received input signal to the main controller 201. Further, the input/output controller 209 receives characters, images, and screens from the main controller 201 and the display controller 207, and outputs received characters, images, and screens to the touch panel 210a, controlling the touch panel 210a to display the characters, images, and screens.

(4) Display Controller 207

(Reception of Operation Content)

In the emulation mode, the display controller 207 receives content of an operation received from a user from the remote panel 210 via the input/output controller 209. Here, an operation received from a user includes an operation equivalent to an operation received from a user by the operation panel 19 of the image forming device 10, an operation indicating an end of acquisition of subject screen data, and the like. An operation indicating an end of acquisition of subject screen data means ending emulation mode.

The display controller 207 determines whether or not content of an operation received from a user indicates an end of acquisition of subject screen data. When content of an operation received from a user indicates an end of acquisition of subject screen data, the display controller 207 outputs an end notification as control information to the main controller 201, in order to end the emulation mode and notify the image forming device 10 and the test execution device 40 of the end of acquisition of subject screen data.

(Generation and Display of First Screen)

When mutual device authentication between the operation terminal 20 and the image forming device 10 is successful, the display controller 207 reads from the storage 202 a screen ID that identifies a screen to be displayed first in the emulation mode.

The display controller 207 reads from the storage 202 a screen template identified by the screen ID read from the storage 202. Next, the display controller 207 generates a screen using the screen template, and outputs the generated screen to the remote panel 210 via the input/output controller 209.

(Screen Change Control)

The display controller 207 reads from the screen change table 211 screen change information including a screen ID read from the storage 212. The screen change information includes one or more entries of option information.

When content of an operation received from a user does not indicate an end of acquisition of subject screen data, the display controller 207 determines whether or not to change screens using the screen change table 211 and the content of the operation. That is, the display controller 207 identifies from the screen change table 211 an option ID corresponding to content of the received operation, and determines whether or not there is a destination screen ID corresponding to the identified option ID. If there is a destination screen ID, the display controller 207 determines that the screen is to change. If there is no destination screen ID, the display controller 207 determines that the screen is not to change.

When determining that the screen is to change, the display controller 207 outputs the received operation content to the main controller 201 in order to notify the image forming device 10 of the screen change.

(Generation and Display of Next Screen)

When there is a destination screen ID, the display controller 207 reads from the storage 202 a screen template identified by the destination screen ID. Next, the display controller 207 generates a screen using the screen template, and outputs the generated screen to the remote panel 210 via the input/output controller 209.

(Next Screen Change Control)

When there is a destination screen ID, the display controller 207 reads from the screen change table 211 screen change information including the destination screen ID as a screen ID. Subsequently, the display controller 207 controls the screen change according to the screen change control method described above.

(5) Main Controller 201

The main controller 201 controls the storage 202, the communication controller 205, the display controller 207, and the input/output controller 209.

The main controller 201 receives an acquisition instruction indicating acquisition of subject screen data from the touch panel 210a via the input/output controller 209. On receiving an acquisition instruction, the main controller 201 causes the operation terminal 20 to switch from the normal mode to the emulation mode. The main controller 201 transmits the acquisition instruction to the image forming device 10 via the wireless communicator 206 and the antenna 203.

Further, the main controller 201 performs mutual device authentication between the main controller 201 of the operation terminal 20 and a main controller 100 of the image forming device 10 (described later).

The main controller 201 receives from the display controller 207 a notification of an end of acquisition of subject screen data (end notification). Upon receiving the end notification, the main controller 201 transmits the end notification to the image forming device 10 via the wireless communicator 206 and the antenna 203. In this case, the main controller 201 causes the operation terminal 20 to switch from the emulation mode to the normal mode, and ends a process of acquiring subject screen data.

When it is determined according to the display controller 207 that a screen change is to occur, the main controller 201 receives from the display controller 207 operation content received from a user. The main controller 201 transmits the operation content to the image forming device 10 via the wireless communicator 206 and the antenna 203.

1.3. Image Forming Device 10

The image forming device 10 is a tandem-type color multi-function peripheral (MFP) that has functions such as scanning, printing, and copying.

The image forming device 10, as illustrated in FIG. 1, includes a sheet feeder 13 that stores and feeds sheets in a lower portion of the body of the image forming device 10. Above the sheet feeder 13 is a print engine 12 that forms images by electrophotography. Above the print engine 12 is a scanner 11 that reads a document surface and generates image data, and the operation panel 19 that displays an operation screen to guide user operations and accepts input operations from a user.

The image forming device 10 may operate in a normal mode or an emulation mode depending on an instruction from the operation terminal 20.

In the emulation mode, the image forming device 10 changes a screen displayed on the operation panel 19 according to a remote operation from the operation terminal 20, and the screen displayed on the operation panel 19 is output to the test execution device 40 as subject screen data. Further, in this case, the image forming device 10 only changes the screen displayed on the operation panel 19, and does not execute a job such as a print job or copy job.

On the other hand, in the normal mode, the image forming device 10 executes a job such as a print job or copy job according to a remote instruction from the operation terminal 20.

The scanner 11 includes an automatic document feeder. The automatic document feeder conveys documents set on a document tray, one sheet at a time, to a document glass plate. The scanner 11 scans (reads) an image of a document conveyed to a defined position on the document glass plate by the automatic document feeder by moving the scanner, and acquires, via the scan, image data consisting of a red (R), green (G), and blue (B) multi-value digital signal. The scanner 11 writes acquired image data to an image memory 104 (described later).

Each color component of image data acquired by the scanner 11 is subjected to various data processes in the control circuitry 14, and further converted to yellow (Y), magenta (M), cyan (C), and black (K) reproducible color image data.

The print engine 12 includes an intermediate transfer belt, a drive roller, a driven roller, and a backup roller that keep the intermediate transfer belt taut, and imaging units, fixing units, and the like. The imaging units face the intermediate transfer belt at defined intervals along a running direction of the intermediate transfer belt. Each imaging unit includes a photosensitive drum as an image carrier, a light-emitting diode (LED) array for exposing and scanning a surface of the photosensitive drum, a charger, a developing unit, a cleaner, and a primary transfer roller.

The sheet feeder 13 includes sheet feeding cassettes that can store sheets of different sizes, pickup rollers for feeding sheets from the sheet feeding cassettes to a conveyance path, a manual feed tray for placing sheets, and pickup rollers for feeding sheets from the manual feed tray to the conveyance path.

In each imaging unit, the photosensitive drum is uniformly charged by the charger and exposed by the LED array to form an electrostatic latent image on a surface of the photosensitive drum. The electrostatic latent image is developed by the developing unit of a corresponding color, forming a Y, M, C, or K color toner image on the surface of the photosensitive drum. Each toner image is sequentially transferred onto a surface of the intermediate transfer belt by electrostatic action of the primary transfer roller disposed on a reverse side of the intermediate transfer belt.

Timed to match the imaging operations of the imaging units, a sheet is fed from any one of the sheet feeding cassettes or the manual feed tray of the sheet feeder 13, and conveyed on the conveyance path to a secondary transfer position where the secondary transfer roller and the backup roller sandwich the intermediate transfer belt. At the secondary transfer position, the YMCK color toner image on the intermediate transfer belt is transferred to the sheet by electrostatic action of the secondary transfer roller. The YMCK color toner image on the sheet is further conveyed to the fixing unit.

When the YMCK color toner image on a surface of the sheet passes through a fixing nip of the fixing unit formed between a heating roller and a pressure roller pressed against the heating roller, the YMCK color toner image is fused to the surface of the sheet by heat and pressure. After passing through the fixing unit, the sheet is delivered to a discharge tray.

The operation panel 19 includes the display 18, which includes a liquid crystal display (LCD) panel or the like, and displays content set by a user and various messages.

Further, the operation panel 19 accepts job settings from a user such as a copy start instruction, a number of copies setting, a copy condition setting, data output destination setting, and the like.

1.4. Control Circuitry 14

Figure 4:
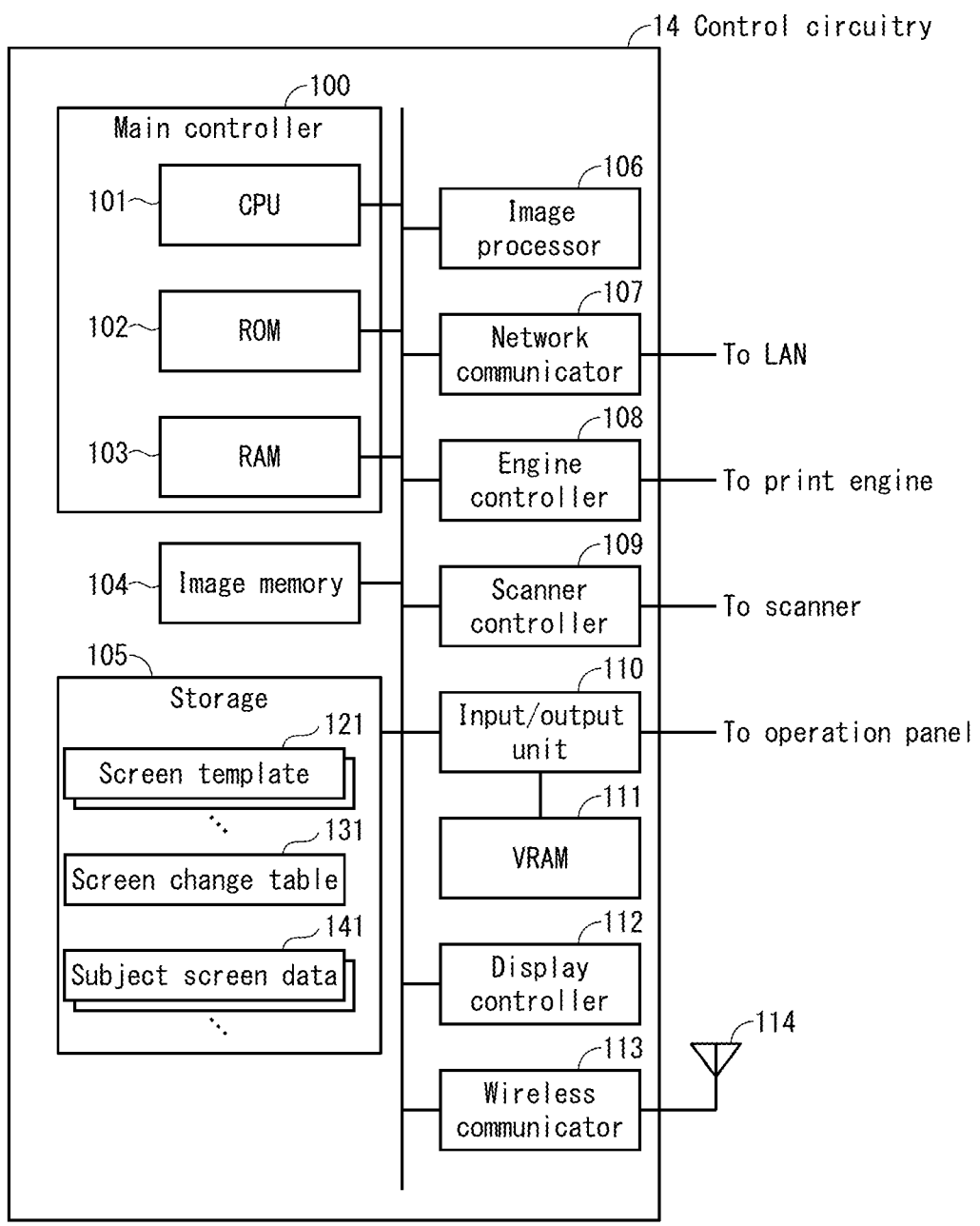
FIG. 4 is a block diagram illustrating structure of control circuitry 14 of an image forming device 10.

As illustrated in FIG. 4, the control circuitry 14 includes the main controller 100, the image memory 104, a storage 105, an image processor 106, a network communicator 107, an engine controller 108, a scanner controller 109, an input/output unit 110, video random access memory (VRAM) 111, a display controller 112, a wireless communicator 113, and the like. The antenna 114 is connected to the wireless communicator 113.

(1) Main Controller 100

The main controller 100 includes a central processing unit (CPU) 101, a ROM 102, a RAM 103, and the like.

The RAM 103 includes a semiconductor memory, temporarily stores various control variables, and provides a work area when the CPU 101 executes a program.

The ROM 102 includes a semiconductor memory, and stores in advance control programs and the like for executing various jobs such as a scan job, a copy job, a print job, etc.

The CPU 101 operates according to control programs stored in the ROM 102.

As described above, the main controller 100 includes the CPU 101, the ROM 102, the RAM 103, and the like, and therefore uniformly controls the image memory 104, the storage 105, the image processor 106, the network communicator 107, the engine controller 108, the scanner controller 109, the input/output unit 110, the display controller 112, the wireless communicator 113, and the like, according to a scan job, a copy job, a print job, or the like.

For example, according to an operation according to a control program, upon receiving a print job via the network communicator 107, the main controller 100 instructs the engine controller 108 to cause the print engine 12 to execute an image forming operation based on the print job.

(Acquisition and Transmission of Subject Screen Data)

The main controller 100 receives from the operation terminal 20 an acquisition instruction to acquire subject screen data via the antenna 114 and the wireless communicator 113. On receiving an acquisition instruction, the main controller 100 causes the image forming device 10 to switch from the normal mode to the emulation mode. Further, on receiving an acquisition instruction, the main controller 100 performs mutual device authentication with the main controller 201.

When mutual device authentication with the main controller 201 is successful, the main controller 100 transmits the acquisition instruction to the test execution device 40 via the network communicator 107 and the LAN 5. Further, on receiving an acquisition instruction, the main controller 100 performs mutual device authentication with a main controller 401 of the test execution device 40 (see FIG. 9).

When a new screen is displayed on the operation panel 19, the main controller 100 receives from the input/output unit 110 subject screen data based on the newly displayed screen. Next, the main controller 100 transmits the subject screen data together with a screen ID identifying a screen represented by the subject screen data to the test execution device 40, via the network communicator 107 and the LAN 5.

The main controller 100 receives from the display controller 112 an end notification of an end of acquisition of subject screen data. On receiving the end notification, the main controller 100 transmits the end notification as control information to the test execution device 40 via the network communicator 107 and the LAN 5. Further, on receiving the end notification, the main controller 100 causes the image forming device 10 to switch from the emulation mode to the normal mode, and ends a process of acquiring subject screen data.

(2) Image Memory 104 and Storage 105

The image memory 104 includes semiconductor memory and temporarily stores image data of a print job or the like.

The storage 105 includes a nonvolatile semiconductor memory, but the storage 105 may be a hard disk drive.

The storage 105, as illustrated in FIG. 4, stores screen templates 121, a screen change table 131, and the like. Further, the storage 105 stores a screen ID that identifies a screen to be displayed at a start of emulation. Further, the storage 105 includes a region for storing subject screen data 141.

(Screen Templates 121)

The screen templates 121 are each a template image that is a basis for generating a screen displayed on the operation panel 19. Each screen template is identified by a screen ID that identifies a screen generated based on the screen template.

(Screen Change Table 131)

The screen change table 131 is a data table used for controlling changes of screens displayed on the operation panel 19.

The screen change table 131 has the same structure as the screen change table 211 stored by the operation terminal 20. Thus, detailed description of the screen change table 131 is not repeated here.

(Subject Screen Data 141)

Each datum of subject screen data 141 is screen data representing a screen displayed on the operation panel 19.

(3) Image Processor 106

The image processor 106, for example, performs varied data processing on image data composed of RGB multi-value digital signals included in a print job received from an external terminal device or generated from scanning by the scanner 11, and converts the image data into YMCK reproducible color image data.

(4) Network Communicator 107, Engine Controller 108, and Scanner Controller 109

The network communicator 107 receives print jobs from an external terminal device via the LAN 5. Further, as required, the network communicator 107 outputs messages and the like to an external terminal device.

The engine controller 108 uniformly controls feed operations from the sheet feeder 13, imaging operations of imaging units of each developer color of the print engine 12, and the like, and causes execution of image forming operations.

The scanner controller 109 controls scans of document surfaces by the scanner 11. For example, the scanner controller 109 specifies resolution when the scanner 11 scans a document surface. The scanner controller 109 writes image data received from the scanner 11 to the image memory 104.

(5) Input/Output Unit 110, VRAM 111, and Display Controller 112

(VRAM 111)

The VRAM 111 is a semiconductor memory for storing screen data in which pixel values are arranged in a matrix of rows and columns to constitute a screen to be displayed on the operation panel 19.

(Input/Output Unit 110)

The input/output unit 110 relays data between the display controller 112 and the operation panel 19.

For example, the input/output unit 110 receives a screen, image, message, or the like from the display controller 112, forms on the VRAM 111 a screen to be displayed on the operation panel 19 by the received screen, image, message, or the like, and outputs the screen to the operation panel 19 via the VRAM 111.

When a screen displayed on the operation panel 19 is changed to another screen, the input/output unit 110 reads from the VRAM 111 subject screen data based on the screen displayed after the change, and outputs the subject screen data to the main controller 100. Here, the subject screen data is composed of pixel values arranged in a matrix of rows and columns, and each pixel value is RGB multi-gradation data.

(Display Controller 112)

The display controller 112, like the display controller 207, controls changes of screens to be displayed on the display 18 of the operation panel 19.

When device authentication between the main controller 100 and the main controller 401 is successful, the display controller 112 reads from the storage 105 a screen ID identifying a screen to be displayed at a start of emulation.

Next, the display controller 112 reads from the storage 105 a screen template identified by the screen ID read from the storage 105. Next, the display controller 112 generates a first screen using the screen template read, and outputs the generated first screen to the operation panel 19 via the input/output unit 110.

When operation content is received from the operation terminal 20, the display controller 112 reads from the screen change table 131 a destination screen ID identifying a screen to be displayed next according to the operation content. Next, the display controller 112 reads from the storage 105 a screen template identified by the destination screen ID read from the screen change table 131. Next, the display controller 112 generates a screen using the screen template read, and outputs the generated screen to the operation panel 19 via the input/output unit 110.

Figure 5:
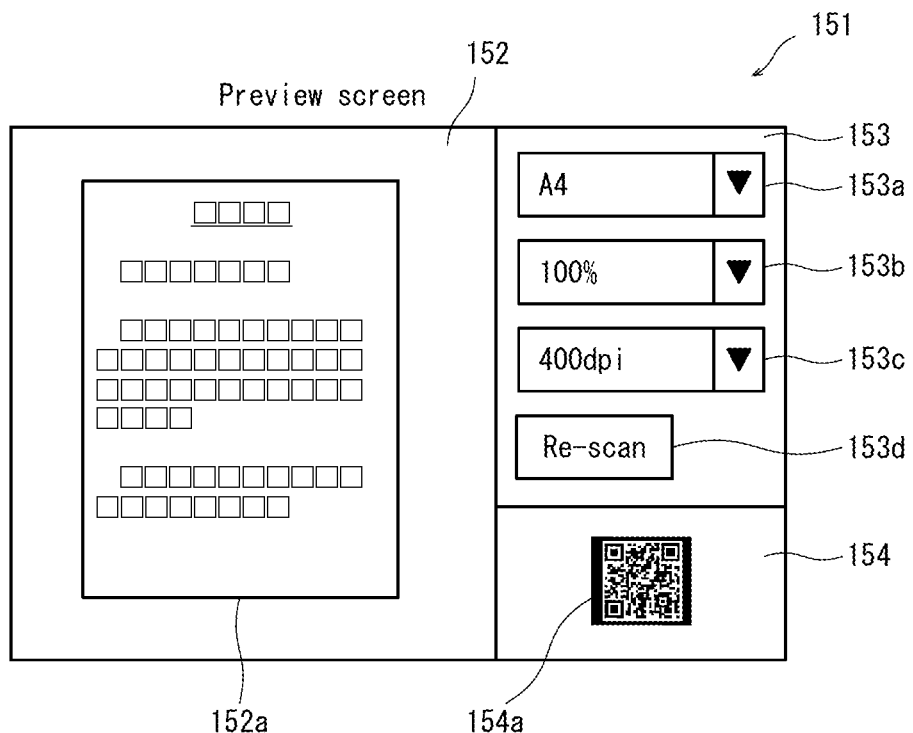
FIG. 5 illustrates a preview screen 151.

Here, FIG. 5 illustrates an example of a screen generated by the display controller 112 in the normal mode. As illustrated, the display controller 112 generates a preview screen 151. The preview screen 151 includes a preview region 152, a menu region 153, and an important region 154.

In the preview region 152 is displayed a preview image 152a of image data read by document scanning. In the menu region 153 is displayed options 153a, 153b, 153c, and 153d. The options 153a, 153b, and 153c are, for example, options for selecting paper size, increasing/decreasing size, and resolution, and the option 153d is, for example, a button for executing another scan. In the important region 154 is displayed an optical code 154a. Here, the optical code 154a illustrates, as an example, a location on the Internet of an operation manual of the image forming device 10. Thus, the optical code 154a is an image that does not change every time the preview screen 151 is displayed. Accordingly, the optical code 154a is a subject of a test by the test execution device 40.

Further, the preview image 152a, the options 153a, 153b, 153c, 153d, the optical code 154a, etc., are notifications for notifying a user of functions of the image forming device 10 (a preview image display function, an option selection function, an optical code display function, etc.) The preview region 152, the menu region 153, the important region 154, and the like each include a notification entry.

The preview screen 151 illustrated in FIG. 5 is an example of a screen displayed in the normal mode. When in the emulation mode, scanning is not executed, and therefore only a frame indicating a position where the preview image 152a should be displayed is displayed in the preview region 152. The actual preview image displayed in the preview region 152 is not a subject of a test by the test execution device 40, while position of a frame indicating a position where the preview image 152a should be displayed is a subject of a test by the test execution device 40.

The display controller 112 receives various types of control information from the operation terminal 20. On receiving control information, the display controller 112 determines whether or not the control information indicates an end of acquisition of subject screen data. When the control information indicates an end of acquisition of subject screen data, the display controller 112 outputs an end notification to the main controller 100 as control information.

When the control information does not indicate an end of acquisition of subject screen data, the display controller 112 continues processing.

(6) Wireless Communicator 113 and Antenna 114

The wireless communicator 113, like the wireless communicator 206, includes communication circuitry and a communication controller.

The communication circuitry and the communication controller of the wireless communicator 113 and the antenna 114 communicate by short-range wireless system based on a wireless LAN standard such as IEEE 802.11a, IEEE 802.11b, IEEE 802.11n, IEEE 802.11ac, or the like.

The antenna 114 is connected to the communication circuitry, and transmits and receives signals wirelessly to and from other devices equipped with a short-range wireless communication function, such as the operation terminal 20. The communication circuitry performs frequency selection, frequency conversion, and the like on signals transmitted and received by the antenna 114. The communication controller demodulates a received signal from the communication circuitry, and outputs to the main controller 100. Further, the communication controller demodulates a received signal from the main controller 100, and outputs to the communication circuitry.

More specifically, the wireless communicator 113 received from the operation terminal 20, by wireless communication, a start instruction for acquisition of subject screen data, an end notification for acquisition of subject screen data, and operation content of the operation terminal 20. When a start instruction, end notification, or operation content is received, the received start instruction, end notification, or operation content is output to the main controller 100.

1.5. Test Instruction Device 30

As illustrated in FIG. 1, the test instruction device 30 includes a main body 31, a monitor 32, a keyboard 33, and a mouse 34.

Figure 6:
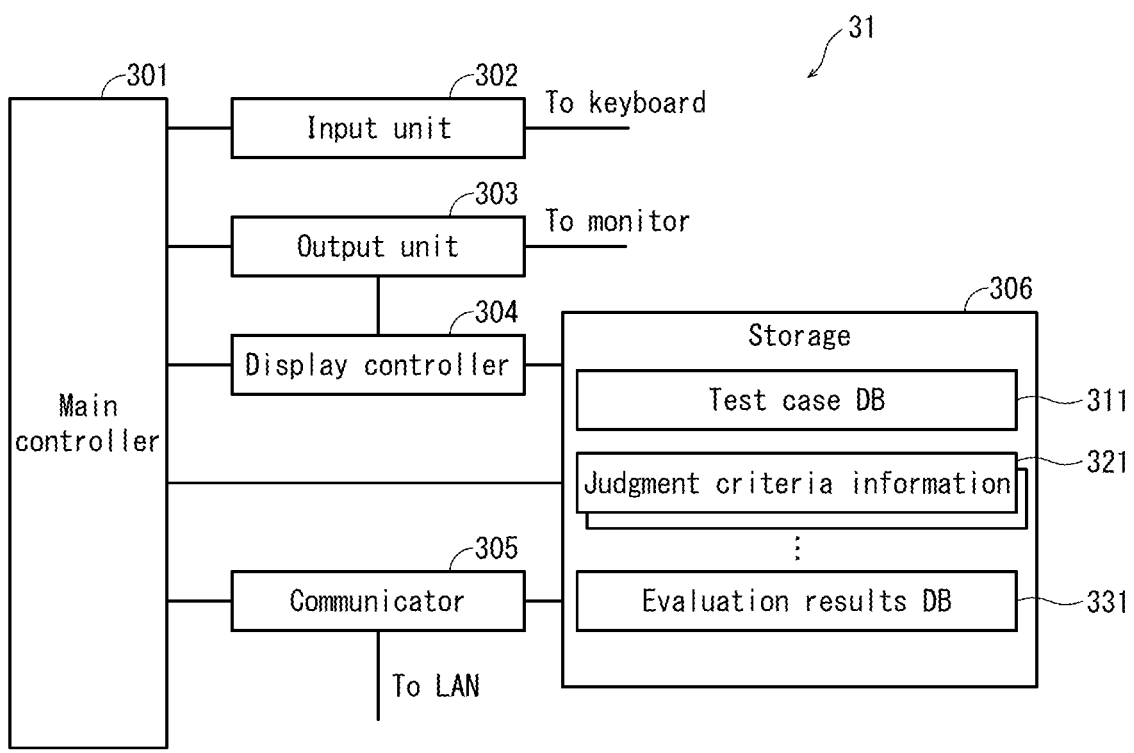
FIG. 6 is a block diagram illustrating structure of a main body 31 of a test instruction device 30.

Further, as illustrated in FIG. 6, the main body 31 includes a main controller 301, an input unit 302, an output unit 303, a display controller 304, a communicator 305, and a storage 306.

The input unit 302 is connected to the keyboard 33 and the mouse 34, and the output unit 303 is connected to the monitor 32. The keyboard 33 is used to input characters, etc., and the mouse 34 is used as a pointing device. The monitor 32 displays an image.

More specifically, the main body 31 is a computer system including a microprocessor, ROM, RAM, and the like. The RAM stores a computer program. The microprocessor operates according to a computer program. Thus, functions of the main controller 301, the input unit 302, the output unit 303, the display controller 304, and the communicator 305 are achieved.

As one example, the test instruction device 30 is a personal computer (PC).

(1) Storage 306

As one example, the storage 306 includes a hard disk drive, but the storage 306 may be composed of a nonvolatile semiconductor memory.

As illustrated in FIG. 6, the storage 306 stores a test case DB 311 and has regions for storing judgment criteria information 321 and an evaluation results DB 331. Further, the storage 306 stores a screen template for generating a screen for setting judgment criteria and a screen template for generating a screen for displaying an evaluation results DB.

(Test Case DB 311)

The test case DB 311 is described later as a test case DB 421 (FIG. 10). The test case DB 311 and the test case DB 421 have the same data structure and include the same data as each other.

(Judgment Criteria 321)

Each entry of the judgment criteria 321 includes a screen name, a region name, a small item region name, and an intensity (see judgment criteria DB 431 illustrated in FIG. 11). The screen name is a name indicating a reference screen used as a test reference. Each region name is a name indicating a region, when a screen to be tested is composed of more than one region. One display screen may contain one or more regions. Each small item region name is a name indicating a small item region, when a region is composed of more than one small item region. One region may contain one or more small item regions. Intensity (also referred to as a judgment criterion) indicates a permissible range of difference between a display screen (inspected image) being tested and a reference screen (reference image), in order for the display screen to be considered eligible.

For example, intensity may be one of "strong" (100%), "medium" (80%), and "weak" (60%).

Here "strong" (100%) intensity with respect to reference screen size indicates that a permissible range of a ratio of size difference between a display screen and a reference screen is 0%, or in other words that the display screen and the reference screen size must exactly match.

Further, "medium" (80%) intensity with respect to reference screen size indicates that a permissible range of a ratio of size difference between a display screen and a reference screen is from 0% to 20%, or in other words that the display screen and the reference screen size need not exactly match, and that a difference up to 20% is acceptable.

Further, "weak" (60%) intensity with respect to reference screen size indicates that a permissible range of a ratio of size difference between a display screen and a reference screen is from 0% to 40%, or in other words that the display screen and the reference screen size need not exactly match, and that a difference up to 40% is acceptable.

Intensity "strong", is a stricter permissible range than "medium" and "weak". Further, intensity "medium" is a more permissible range than "strong" and stricter than "weak". Further, intensity "weak", is a more permissible range than "strong" and "medium".

Further details of intensity are provided later with reference to FIG. 15A and FIG. 15B.

(Evaluation Results DB 331)

The evaluation results DB 331 is described later as the evaluation results DB 441 (FIG. 13) or the evaluation results DB 441a (FIG. 14).

(2) Communicator 305

The communicator 305 transmits and receives information to and from an external device such as the test execution device 40 via the LAN 5.

(3) Input Unit 302 and Output Unit 303

The input unit 302 receives input such as characters and positions from the keyboard and mouse, respectively.

For example, the input unit 302 receives from a user an instruction to set a judgment criterion, a screen ID identifying a screen for which a judgment criterion should be set, a setting method indicating whether a judgment criterion is set for each function and each region, a judgment criterion for each function or region, an instruction indicating an end of judgment criteria setting, an instruction indicating a start of a test, and an instruction indicating a request for an evaluation results DB.

The output unit 303 outputs to the monitor 32 a setting screen for each function or region, a message indicating an end of a test, and content of an evaluation database.

The monitor 32 displays a setting screen for each function or region, a message indicating an end of a test, and content of an evaluation database.

(4) Display Controller 304
(Judgment Criteria Setting Screen Display)

The display controller 304 receives from the main controller 301 test information read out from the test case DB 311, and generates a setting screen for setting judgment criteria for each function or region, using received test information, and outputs a generated setting screen to the monitor 32 via the output unit 303.

(Setting Screen Example)

As examples of setting screens generated by the display controller 304, FIG. 7 illustrates a setting screen 341 and FIG. 8 illustrates a setting screen 351. The setting screens 341, 351 are screens for setting judgment criteria for each function and region, with respect to the preview screen illustrated in FIG. 5.

(Setting Screen 341)

The setting screen 341 illustrated in FIG. 7 includes title display sections 342, 343, 344, 345, 346, 347 that display titles, and check boxes 342a, 342b, 342c for setting judgment criteria for each title display section. The check boxes 342a, 342b, 342c correspond to "weak", "medium", and "strong" judgment criteria, respectively. A user can select any one of the check boxes 342a, 342b, 342c.

For example, "preview region" is displayed in the title display section 342, and the check box 342a indicating "weak" is selected among the check boxes 342a, 342b, 342c corresponding to the title display section 342.

The title display section 342 and the check boxes 342a, 342b, 342c corresponding to the title display section 342 correspond to the preview image 152 illustrated in FIG. 5.

For example, "menu region" is displayed in the title display section 343, and below the title display section 343 in four title display sections are displayed: "first field", "second field", "third field", and "fourth field".

Here, the title display section 343, the four title display sections below the title display section 343, and checkboxes corresponding thereto all correspond to the menu region 153 illustrated in FIG. 5. Further, the four title display sections below the title display section 343 and checkboxes corresponding thereto correspond to the options 153a, 153b, 153c, 153d in the menu region 153 illustrated in FIG. 5.

"Medium" is selected for check boxes corresponding to "first field", "second field", and "third field", and "weak" is selected for check boxes corresponding to "fourth field".

Further, for example, "important region" is displayed in the title display section 345, and below the title display section 345 in two title display sections 346, 347 are displayed: "optical code image displacement" and "optical code image internal differences". "Weak" and "strong" are selected for check boxes corresponding to the title display sections 346 and 347, respectively.

The title display section 345, the two title display sections 346, 347 below the title display section 345, and the check boxes corresponding thereto all correspond to the important region 154 illustrated in FIG. 5.

(Generation of Screen to Set Judgment Criteria for Each Function)

The display controller 304 generates a screen for setting judgment criteria for each function provided when the reference screen is displayed.

The display controller 304 reads from the storage 306 a screen template for generating a screen for setting judgment criteria. The screen template includes only a title "judgment criteria setting" of a screen for setting judgment criteria. The display controller 304 first draws a screen name included in the received test information above the screen template. Next, the display controller 304 generates in the screen template three check boxes for selecting "weak", "medium", and "strong" for each test content included in the received test information. Further, the display controller 304 draws each region name, small item region name, etc., included in the test information to correspond to the groups of three check boxes.

In this way, a screen is generated for setting judgment criteria for each function provided when displaying a reference screen.

(Setting Screen 351)

Further, the setting screen 351 illustrated in FIG. 8 includes title display sections 352, 353, 354 that display titles, and check boxes 352a, 352b, 352c for setting judgment criteria for each title display section.

The check boxes 352a, 352b, 352c correspond to "weak", "medium", and "strong" judgment criteria, respectively. A user can select any one of the check boxes 352a, 352b, 352c.

For example, "preview region" is displayed in the title display section 352, and the check box 352a indicating "weak" is selected among the check boxes 352a, 352b, 352c corresponding to the title display section 352.

For example, "menu region" is displayed in the title display section 353. "Medium" is selected for check boxes corresponding to the title display section 353.

For example, "important region" is displayed in the title display section 354. "Strong" is selected for check boxes corresponding to the title display section 354.

(Generation of Screen to Set Judgment Criteria for Each Region)

Here, the display controller 304 generates a screen for setting judgment criteria for each region in the reference screen.

The display controller 304 reads from the storage 306 a screen template for generating a screen for setting judgment criteria. The screen template includes only a title "judgment criteria setting" of a screen for setting judgment criteria. The display controller 304 first draws a screen name included in the received test information above the screen template. Next, the display controller 304 generates in the screen template three check boxes for selecting "weak", "medium", and "strong" for each region included in the received test information. Further, the display controller 304 draws each region name included in the test information to correspond to the groups of three check boxes.

In this way, a screen is generated for setting judgment criteria for each region in a reference screen.

(Generation of Screen Showing Evaluation Results DB)

The display controller 304 reads from the storage 306 a screen template for generating a screen for showing an evaluation results DB. Further, the display controller 304 receives the evaluation results DB from the main controller 301, writes content of the evaluation results DB to the screen template, and generates a screen displaying the evaluation results DB. The display controller 304 outputs the generated screen to the monitor 32 via the output unit 303.

(5) Main Controller 301

The main controller 301 controls the input unit 302, the output unit 303, the display controller 304, the communicator 305, and the storage 306.

The main controller 301 performs mutual device authentication between the main controller 301 and the main controller 401 of the test execution device 40.

(Setting Judgment Criteria)

The main controller 301 determines whether or not an instruction for setting a judgment criterion has been received from a user via the input unit 302. When determining that a setting instruction has been received, the main controller 301 performs judgment criteria setting processing as described below.

When mutual device authentication is successful, the main controller 301 receives a screen ID for identifying a screen for which a judgment criterion is to be set from the input 302.

Next, the main controller 301 reads test information including the received screen ID from the test case DB 311 stored in the storage 306.

The main controller 301 receives from the input unit 302 a setting method indicating whether a judgment criterion is to be set for a function or region, and determines whether the received setting method indicates setting for a function or region.

When the received setting method is determined to indicate setting for a function or region, the main controller 301 causes the display controller 304 to generate a setting screen of a function or a region, and causes the monitor 32 to display the generated setting screen.

The main controller 301 receives a judgment criterion (intensity) from the input unit 302, and temporarily writes the judgment criteria information 321 including the received judgment criterion to the storage 306. Next, the main controller 301 reads the judgment criteria information 321 from the storage 306, and transmits the judgment criteria information 321 to the test execution device 40 via the communicator 305 and the LAN 5.

The main controller 301 determines whether or not an instruction indicating an end of setting judgment criteria has been received from a user via the input unit 302. When determining that an instruction indicating an end of setting judgment criteria has not been received, the main controller 301 repeats judgment criteria setting processing.

When determining that an instruction indicating an end of setting judgment criteria has been received, the main controller 301 transmits an end notification indicating an end of setting judgment criteria to the test execution device 40 via the communicator 305 and the LAN 5, and ends judgment criteria setting processing.

(Test Instruction and End)

The main controller 301 receives a test start instruction from the input unit 302, and transmits the test start instruction to the test execution device 40 via the communicator 305 and the LAN 5.

Further, the main controller 301 receives an end notification indicating an end of testing from the test execution device 40 via the LAN 5 and the communicator 305. On receiving an end notification, the main controller 301 outputs an end notification to the output unit 303, causing the monitor 32 to display an end of testing. Subsequently, the main controller 301 performs a control such that feedback processing is executed.

(Feedback Processing)

The main controller 301 receives an evaluation results DB transmission request from a user via the keyboard 33 and the input unit 302. On receiving a transmission request, the main controller 301 transmits the transmission request to the test execution device 40 via the communicator 305 and the LAN 5.

Further, the main controller 301 receives the evaluation results DB from the test execution device 40 via the LAN 5 and the communicator 305, and writes the evaluation results DB to the storage 306 as the evaluation results DB 331.

The main controller 301 outputs the evaluation results DB to the display controller 304, instructs the display controller 304 to generate a screen for displaying the evaluation results DB, and causes the monitor 32 to display the evaluation results DB.

The main controller 301 receives an evaluation result for each judgment result in the evaluation results DB from a user via the keyboard 33 and the input unit 302, and writes received evaluation results to the evaluation result DB 331.

The main controller 301 reads from the storage 306 the evaluation results DB 331 in which the evaluation results are written, and transmits the evaluation results DB to the test execution device 40 via the communicator 305 and the LAN 5.

1.6. Test Execution Device 40

As illustrated in FIG. 9, the test execution device 40 includes a CPU 411 (hardware processor), ROM 412, RAM 413 (non-transitory computer-readable recording medium), an input/output unit 404, a communicator 405, and the storage 406 (storage). Thus, the test execution device 40 is a computer system including a CPU, ROM, and RAM.

The RAM 413 stores computer programs (computer-executable instructions). The CPU operates according to computer programs. As a result, the CPU 411, the ROM 412, and the RAM 413 functionally constitute a main controller 401, a test executor 402, and a feedback executor 403. The test executor 402 further includes a detection unit 402a and a determination unit 402b.

When the CPU 411 executes the computer programs stored in the RAM 413, the test execution device 40 acquires the subject image and a reference image corresponding to the subject image; acquires a judgment criterion indicating a range of eligibility for differences between images; detects a difference between the subject image and the reference image; and, when the difference is detected, judges eligibility of the subject image by determining whether or not the difference is included in the range indicated by the judgment criterion.

As one example, the test execution device 40 is a personal computer (PC).

(1) Storage 406

As one example, the storage 406 includes a hard disk drive, but the storage 406 may be composed of a nonvolatile semiconductor memory.

As illustrated in FIG. 9, the storage 406 stores the test case DB 421, the judgment criteria DB 431, the evaluation results DB 441, and reference screen data 461. Further, the storage 406 includes a region for storing subject screen data 471 and log information 451.

(Reference Screen Data 461)

Each datum of reference screen data (reference image) 461 is data that serves as a basis for a reference screen that is a test reference for image data to be tested. Here, each datum of the reference screen data is composed of pixel values arranged in a matrix of rows and columns, and each pixel value is RGB multi-gradation data. Each datum of the reference screen data is identified by a screen ID.

Each datum of the reference screen data 461 may have the same screen size (the same number of vertical and horizontal pixels) or may have different screen sizes.

As an example, each datum of reference screen data includes regions, as illustrated in FIG. 5, and each region includes a notification for notifying a user of a function of the image forming device 10.

(Subject Screen Data 471)

Each datum of subject screen data (inspected image) is image data to be tested, received from the image forming device 10. Each datum of the subject screen data is composed of pixel values arranged in a matrix of rows and columns, and each pixel value is RGB multi-gradation data. Each datum of the subject screen data is identified by a screen ID.

Each datum of the subject screen data 471 may have the same screen size (the same number of vertical and horizontal pixels) or may have different screen sizes. Further, as described above, screen size of subject screen data may be the same as screen size of reference screen data (the numbers of vertical and horizontal pixels are the same) or may be different.

(Log Information 451)

An example of log information is subject screen data.

(Test Case DB 421)

The test case DB 421, as illustrated in FIG. 10, is a data table including test content for each screen.

The test case DB 421 includes test information 422. Each entry of the test information 422 corresponds to a screen, and indicates test content and the like for the screen.

Each entry of the test information 422 includes a screen ID 423, a screen name 424, and one or more entries of region information 425. When the test information 422 includes one entry of the region information 425, the screen includes only one region. When the test information 422 includes more than one entry of the region information 425, the screen includes more than one region.

Each entry of the region information 425 includes a region name 425a, region coordinates 425b, and one or more entries of small item information 425c. When the region information 425 includes one entry of the small item information 425c, the region in a screen includes one small item region. When the region information 425 includes more than one entry of the small item information 425c, the region in a screen includes more than one small item region. Further, even when one region in a screen includes more than one test content, the region information 425 can include more than one entry of the small item information 425c.

Each entry of the small item information 425c includes a small item region name 426, small item region coordinates 427, and test content 428.

The screen ID 423 is ID information identifying a screen, and the screen name 424 indicates a name of a screen.

The region name 425a indicates a name of a region, and the region coordinates 425b are coordinate values indicating position of the region. The region coordinates 425b include top left coordinate values (x, y) and bottom right coordinate values (x, y) of the region.

The small item region name 426 indicates a name of a small item region, and the small item region coordinates 427 are coordinate values indicating position of the small item region. The small item region coordinates 427 include top left coordinate values (x, y) and bottom right coordinate values (x, y) of the small item region.

The test content 428 indicates test content for a corresponding small item.

(Judgment Criteria DB 431)

The judgment criteria DB 431, illustrated in FIG. 11, is a data table for storing judgment criteria (intensity) set by a user for each function.

The judgment criteria DB 431 includes judgment criteria information 432. Each entry of the judgment criteria information 432 corresponds to one screen, and indicates judgment criteria and the like applicable to the screen.

Each entry of the judgment criteria information includes a screen ID 433, a screen name 434, and one or more entries of region information 435.

Each entry of the region information 435 includes a region name 436 and one or more entries of small item region information 437. Each entry of the small item region information 437 includes a small item region name 438 and an intensity 439.

The screen ID 433 is ID information identifying a screen, and the screen name 434 indicates a name of a screen.

The region name 436 is a name indicating a region.

The small item region name 438 indicates a name of a small item region, and the intensity 439 is a judgment criterion set by a user. The intensity 439 may be any one of "strong", "medium", or "weak".

Examples shown in the judgment criteria DB 431 correspond to examples of the test case DB 421 illustrated in FIG. 10. That is, in the judgment criteria DB 431, intensities in the judgment criteria information included in the screen name "preview screen" correspond to the test contents in the test information included in the screen name "preview screen" in the test case DB 421.

More specifically, the test contents "shift in preview screen", "shift in first field", "shift in second field", "shift in third field", "shift in fourth field", "shift in optical code image", and "difference in optical code image" indicated in the test case DB 421 are set, respectively, as intensity "weak", "medium", "medium", "medium", "weak", "medium", and "strong" in the judgment criteria DB 431.

Among small item region names indicated in the test case DB 421, for example, the first field, second field, third field, and fourth field are fields that require user input, and provide a input function to a user. That is, in the judgment criteria DB 431, intensity is set for each function provided on a reference screen serving as a test reference (or a screen to be tested).

Further, in the judgment criteria DB 431, intensity is set corresponding to test content included in the test case DB 421.

(Judgment Criteria DB 431a)

The judgment criteria DB 431a, illustrated in FIG. 12, is a data table for storing judgment criteria (intensity) set by a user for each region.

The data structure (data format) of the judgment criteria DB 431a is the same as the data structure (data format) of the judgment criteria DB 431, and therefore details thereof are not repeated here.

In the judgment criteria DB 431a, the number of items for which intensity is set is smaller than in the judgment criteria DB 431. In the judgment criteria DB 431a, intensity is set for each region.

More specifically, in the judgment criteria DB 431a, intensities "weak", "medium", and "strong" are set for the preview region, the menu region, and the important region, respectively.

(Evaluation Results DB 441)

The evaluation results DB 441, illustrated in FIG. 13, is a data table including judgment results determined by the test execution device 40.

The judgment results DB 441 includes judgment results information 442. Each entry of the evaluation result information 442 corresponds to one screen, and includes one or more judgment results regarding the screen.

Each entry of the evaluation results information 442 includes a screen ID 443, a screen name 444, and one or more entries of region information 445.

Each entry of the region information 445 includes a region name 445a and one or more entries of small item region information 445b. Each entry of the small item region information 445b includes a small item region name 446 and a judgment result 477.

The screen ID 443 is ID information identifying a screen, and the screen name 444 indicates a name of a screen.

The region name 445a is a name indicating a region.

The small item region name 446 is a name indicating a small item region, and the judgment result 447 is a judgment result determined by the test execution device 40. The judgment result 477 is either "OK" (eligible) or "NG" (ineligible). A judgment result of "OK" indicates that a screen, region, or small item being tested is eligible, and a judgment result of "NG" indicates that a screen, region, or small item being tested is ineligible.

(Evaluation Results DB 441a)

The evaluation results DB 441a, illustrated in FIG. 14, is a data table in which evaluation results of a user are added to the evaluation results DB 441.

That is, in the evaluation results DB 441a, the small item region information 445b includes the small item region name 446, the judgment result 477, and an evaluation result 448.

The evaluation result 448 indicates a user evaluation result with respect to a judgment result determined by the test execution device 40, and indicates a result when a judgment result is judged to be inappropriate by the user. Accordingly, when a user judges that a judgment result is appropriate, an evaluation result is not included in the small item region information 445b and is indicated by "-".

Thus, an evaluation result indicates an evaluation result from a user with respect to a judgment result determined by the test execution device 40, and therefore an evaluation results of "NG" or "OK" is set for a judgment result of "OK" or "NG", respectively.

An evaluation result of "OK" indicates that a screen, region, or small item being tested is eligible, and an evaluation result of "NG" indicates that a screen, region, or small item being tested is ineligible.

(2) Communicator 405

The communicator 405 transmits and receives information to and from an external device via the LAN 5.

(3) Test Executor 402

As noted above, the test executor 402 includes the detection unit 402a and the judgment unit 402b.

(a) The detection unit 402a compares reference screen data and subject screen data by perfect matching as follows.

The detection unit 402a executes binarization processing on the multi-gradation reference screen data and the multi-gradation subject screen data, to generate binary reference screen data and binary subject screen data. Next, the detection unit 402a compares pixel values at corresponding pixel positions between the binary reference screen data and the binary subject screen data. If the two pixel values are different, an output value "1" is output for the pixel position, and if the two pixel values are the same, an output value "0" is output for the pixel position. The detection unit 402a repeats this comparison and output for all pixels in the screen data.

In this way, when at least one output value "1" is output, the detection unit 402a determines that there is a difference between the reference screen data and the subject screen data.

By counting a number of pixel position for which an output value "1" is output, among a total number of pixel positions in the screen data, the detection unit 402a can evaluate an area of difference between the reference screen data and the subject screen data. Further, the detection unit 402a may obtain a total number of differences between the reference screen data and the subject screen data by the counting of the number of pixel position for which an output value "1" is output among the total number of pixel positions in the screen data.

(b) If there is no difference between the reference screen data and the subject screen data, the detection unit 402a sets the judgment result to "OK".

(c) If there is a difference between the reference screen data and the subject screen data, the detection unit 402a judges whether or not the difference is in a judgment criteria range, using judgment conditions described later.

(c-1) If the difference is judged to be in a judgment criteria range, the detection unit 402a sets the judgment result to "OK".

(c-2) If the difference is judged to not be in a judgment criteria range, the detection unit 402a sets the judgment result to "NG".

(4) Feedback Processor 403

The feedback processor 403 performs feedback processing as described below, reflecting evaluation results from an evaluator in judgment criteria, according to control of the main controller 401.

The feedback processor 403 judges whether or not a judgment result in an evaluation results DB to which an evaluation result has been added has been corrected. That is, the feedback processor 403 judges whether or not a judgment result is different from an evaluation result. When it is determined that a judgment result has been corrected due to an evaluation result, the feedback processor 403 judges whether the correction due to the evaluation result corrected the judgment result from "NG" to "OK" or from "OK" to "NG".

(a) When it is determined that a correction due to an evaluation result corrected a judgment result from "NG" to "OK", the feedback processor 403 corrects the judgment criterion in the judgment criteria DB 431 to be less strict. In other words, the feedback processor 403 corrects a permissible range indicated by the judgment criterion to a second permissible range (second range) wider than the permissible range. For example, the feedback processor 403 corrects an intensity "strong" to "medium", or "strong" to "weak".

Further, in this case, the feedback processor 403 compares a difference area with a threshold value. The difference area and the threshold value are described later. If the difference area is larger than the threshold value, the feedback processor 403 corrects the judgment criterion in the judgment criteria DB 431 to be much less strict. In other words, when the difference area is larger than the threshold value, the feedback processor 403 corrects a permissible range indicated by the judgment criterion to a second permissible range wider than the permissible range by a defined first extension range. Here, the first extension range is wider than an extension range threshold. For example, the feedback processor 403 corrects an intensity "strong" to "weak".

On the other hand, if the difference area is smaller than or equal to the threshold value, the feedback processor 403 corrects the judgment criterion in the judgment criteria DB 431 to be slightly less strict. In other words, when the difference area is smaller than or equal to the threshold value, the feedback processor 403 corrects a permissible range indicated by the judgment criterion to a second permissible range wider than the permissible range by a defined second extension range. Here, the second extension range is narrower than the extension range threshold. For example, the feedback processor 403 corrects an intensity "strong" to "medium".

(b) When it is determined that a correction due to an evaluation result corrected a judgment result from "OK" to "NG", the feedback processor 403 corrects the judgment criterion in the judgment criteria DB 431 to be stricter. In other words, the feedback processor 403 corrects a permissible range indicated by the judgment criterion to a second permissible range (second range) narrower than the permissible range. For example, the feedback processor 403 corrects an intensity "weak" to "medium", or "medium" to "strong".

(c) When it is determined that no correction of a judgment result occurred, the feedback processor 403 does not execute further processing.

(5) Input/Output Unit 404

The input/output unit 404 reads information from the storage 406 and writes information to the storage 406 according to control of the main controller 401.

(6) Main Controller 401

The main controller 401 controls the test executor 402, the feedback processor 403, the input/output unit 404, the communicator 405, and the storage 406.

(Device Authentication)

The main controller 401 receives from the image forming device 10, via the LAN 5 and the communicator 405, an acquisition instruction to acquire subject screen data. Further, the main controller 401 receives from the test instruction device 30, via the LAN 5 and the communicator 405, a setting instruction to set judgment criteria and an start instruction to start testing.

On receiving an acquisition instruction, the main controller 401 performs mutual device authentication with the main controller 100 of the image forming device 10. Further, on receiving a setting instruction or a start instruction, the main controller 401 performs mutual device authentication with the main controller 301 of the test instruction device 30.

(Acquisition of Subject Screen Data)

The main controller 401 receives from the image forming device 10, via the LAN 5 and the communicator 405, subject screen data and a screen ID identifying a screen represented by the subject screen data. The main controller 401 writes a received screen ID and subject screen data to the storage 406.

Further, the main controller 401 receives from the image forming device 10, via the LAN 5 and the communicator 405, an end notification to end acquisition of subject screen data. On receiving an end notification, the main controller 401 ends acquisition of subject screen data.

(Setting Judgment Criteria)

The main controller 401 receives judgment criteria from the test instruction device 30 via the LAN 5 and the communicator 405. The main controller 401 writes received judgment criteria to the judgment criteria DB 431 stored in the storage 406.

The main controller 401 receives from the test instruction device 30, via the LAN 5 and the communicator 405, an end instruction to end judgment criteria setting. The main controller 401 determines whether or not an end instruction has been received. If an end instruction has not been received, the main controller 401 waits to receive judgment criteria from the test instruction device 30. When an end instruction has been received, the main controller 401 ends judgment criteria setting.

(Test Execution)

Upon receiving a test instruction from the test instruction device 30 via the LAN 5 and the communicator 405, and when device authentication is successful, the main controller 401 executes the following processing (a) through (e) for all test information included in the test case DB 421.

(a) The main controller 401 reads, in order, each entry of test information from the test case DB 421.

(b) The main controller 401 reads from the storage 406 the reference screen data 461 identified by the screen ID included in the read test information, and reads from the storage 406 the subject screen data 471 identified by the screen ID.

(c) The main controller 401 reads from the judgment criteria DB 431 judgment criteria information identified by the screen ID.

(d) The main controller 401 controls the test executor 402 to execute a test of a screen.

(e) The main controller 401 writes judgment results from the test executor 402 to the evaluation results DB 441, and writes log information to the storage 406. An example of log information is subject screen data.

When processing (a) to (e) is complete for all test information included in the test case DB 421, the main controller 401 transmits a completion notification indicating completion of testing to the test instruction device 30 via the communicator 405 and the LAN 5.

(Preparation for Feedback Processing)

The main controller 401 receives from the test instruction device 30, via the LAN 5 and the communicator 405, a transmission request to transmit an evaluation results DB. On receiving a transmission request, the main controller 401 reads the evaluation results DB 441 from the storage 406 and transmits the read evaluation results DB 441 to the test instruction device 30 via the communicator 405 and the LAN 5.

Further, the main controller 401 receives from the test instruction device 30, via the LAN 5 and the communicator 405, an evaluation results DB into which evaluation results are written. On receiving an evaluation results DB, the main controller 401 writes the received evaluation results DB to the storage 406. In other words, the main controller 401 overwrites the evaluation results DB 441 stored in the storage 406 with the received evaluation results DB.

Further, when the received evaluation results DB is written to the storage 406, the main controller 401 controls the feedback processor 403 to execute feedback processing.

1.7. Example of Judgment

The following describes an example of judgment by the test executor 402 of the test execution device 40.

Figures 15A, 15B:
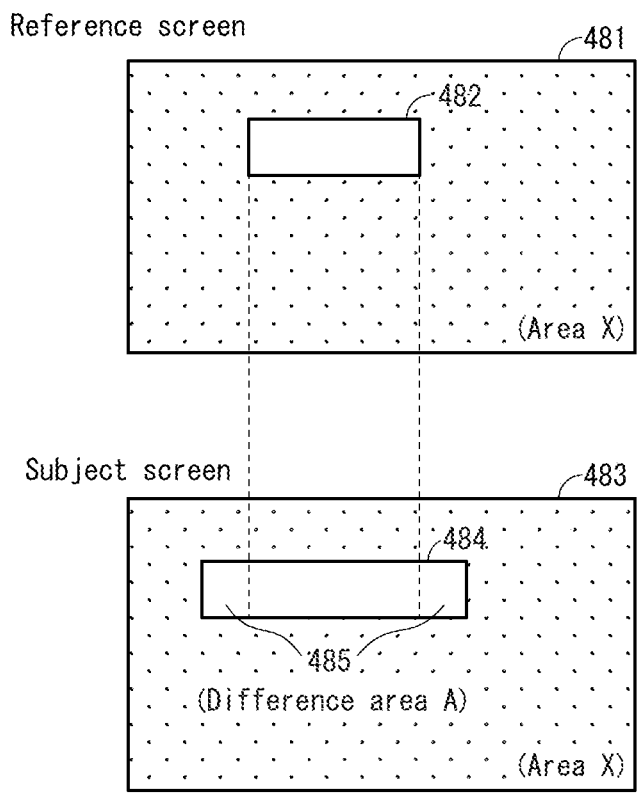
FIG. 15A illustrates a reference screen 481 and a subject screen 483.
FIG. 15B illustrates correspondence between strength, judgment conditions, and judgment results.

As illustrated in FIG. 15A, an object 482 is included in a reference screen 481, and an object 484 is included in a subject screen 483 that is tested by using the reference screen 481. Here, size (number of vertical and horizontal pixels) of the reference screen 481 and size (number of vertical and horizontal pixels) of the subject screen 483 are the same.

Areas occupied by the reference screen 481 and the subject screen are each X, and a difference in area occupied by the object 482 and the object 484 is A.

As illustrated in FIG. 15B, when an intensity 492A "strong" is set, a judgment condition 493a used by the test executor 402 is whether $(1-A/X)=1$. Here, from the viewpoint of permissible range, whether $A/X=0$. If a judgment condition (or permissible range) is satisfied, a judgment result 495a is "OK", and if not satisfied, a judgment result 496a is "NG".

Next, when an intensity 492*b* "medium" is set, a judgment condition 493*b* used by the test executor 402 is whether $(1-A/X) \geq 0.8$. Here, from the viewpoint of permissible range, whether $0.2 \geq A/X$. If a judgment condition (or permissible range) is satisfied, a judgment result 495*b* is "OK", and if not satisfied, a judgment result 496*b* is "NG".

Next, when an intensity 492*c* "weak" is set, a judgment condition 493*c* used by the test executor 402 is whether $(1-A/X) \geq 0.6$. Here, from the viewpoint of permissible range, whether $0.4 \geq A/X$. If a judgment condition (or permissible range) is satisfied, a judgment result 495*c* is "OK", and if not satisfied, a judgment result 496*c* is "NG".

Further, if a judgment condition (493*d*) $0.6 > (1-A/X)$ (or $A/X > 0.4$ in terms of permissible range) is satisfied, a judgment result 495*d* is "NG".

1.8. Example of Screen Judgment

The following describes an example of screen judgment.

Figure 16:
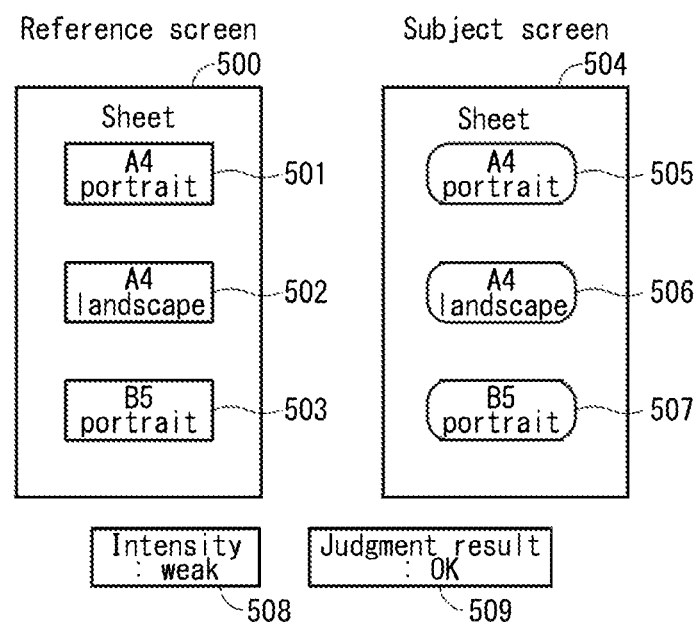
FIG. 16 illustrates a reference screen 500 and a subject screen 504.

(1) As illustrated in FIG. 16, objects 501, 502, 503 are displayed as buttons in a reference screen 500, and objects 505, 506, 507 are displayed as buttons in a subject screen 504.

The objects 501, 502, 503 displayed in the reference screen 500 are rectangular, while corners of the objects 505, 506, 507 displayed in the subject screen 504 are rounded.

This difference in shape of the buttons does not affect functions provided by the buttons on the screens, and therefore the difference between the reference screen 500 and the subject screen 504 is permissible.

Thus, an intensity 508 in this case is set to "weak". In this case, a judgment result 509 is "OK".

Figure 17:
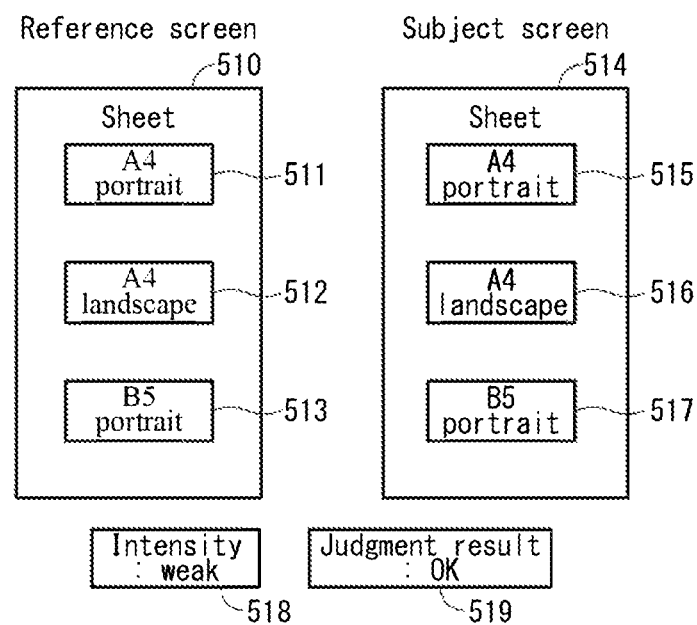
FIG. 17 illustrates a reference screen 510 and a subject screen 514.

(2) As illustrated in FIG. 17, objects 511, 512, 513 are displayed as buttons in a reference screen 510, and objects 515, 516, 517 are displayed as buttons in a subject screen 514.

In the objects 511, 512, 513 displayed in the reference screen 510, characters are displayed in a serif typeface, while in the objects 515, 516, 517 displayed in the subject screen 514, characters are displayed in a sans serif typeface.

This difference in typeface displayed in the buttons does not affect functions provided by the buttons on the screens, and therefore the difference between the reference screen 510 and the subject screen 514 is permissible.

Thus, an intensity 518 in this case is set to "weak". In this case, a judgment result 519 is "OK".

Figure 18:
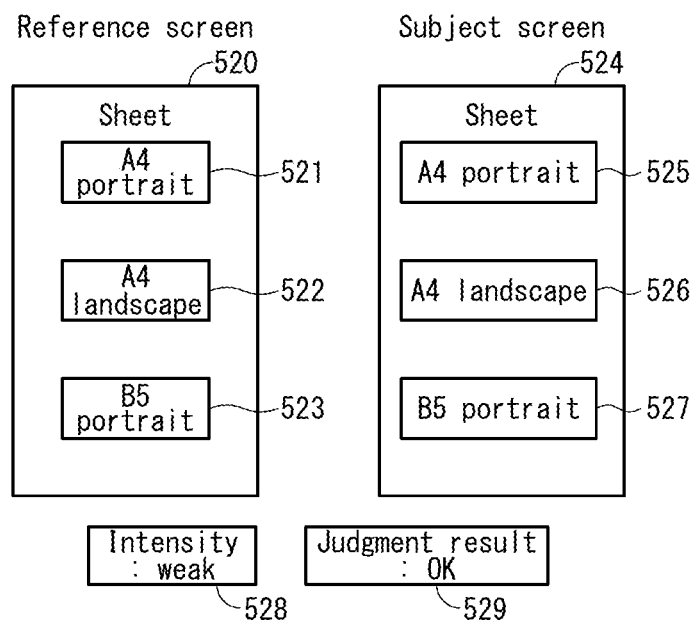
FIG. 18 illustrates a reference screen 520 and a subject screen 524.

(3) As illustrated in FIG. 18, objects 521, 522, 523 are displayed as buttons in a reference screen 520, and objects 525, 526, 527 are displayed as buttons in a subject screen 524.

The objects 521, 522, 523 displayed in the reference screen 520 are rectangular, and the objects 525, 526, 527 displayed in the subject screen 524 are also rectangular. However, sizes (horizontal width) of the objects 525, 526, 527 are larger than sizes (horizontal width) of the object 521, 522, 523.

This difference in size of the buttons does not affect functions provided by the buttons on the screens, and therefore the difference between the reference screen 520 and the subject screen 524 is permissible.

Thus, an intensity 528 in this case is set to "weak". In this case, a judgment result 529 is "OK".

The differences illustrated in FIG. 16, FIG. 17, FIG. 18 may occur due to a version upgrade of a browser application that controls display of the operation panel 19.

Further, when the test executor 402 compares reference screen data and subject screen data, noise is generated in the binarization process performed on the multi-gradation reference screen data and the multi-gradation subject screen data, and this may cause differences.

Figure 19:
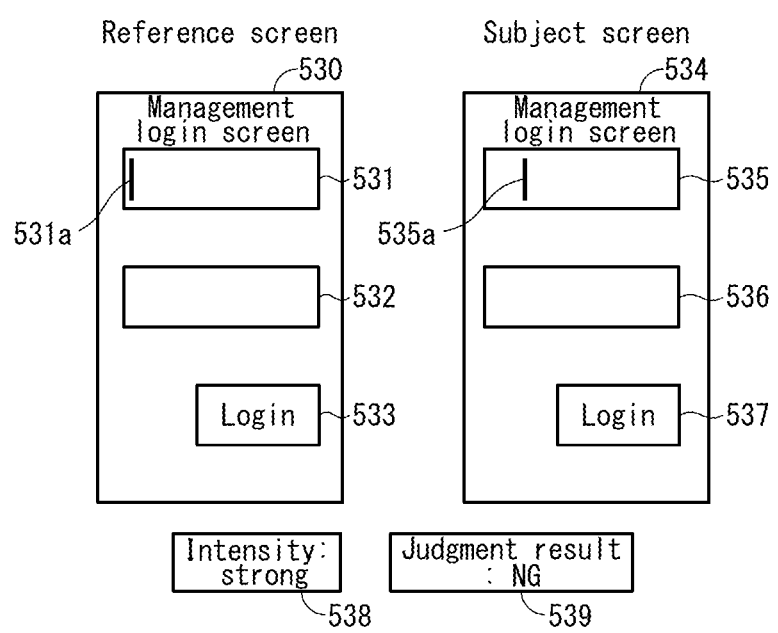
FIG. 19 illustrates a reference screen 530 and a subject screen 534.

(4) As illustrated in FIG. 19, objects 531, 532 are displayed as input fields and an object 533 is displayed as a button in the reference screen 530, and a cursor 531*a* is displayed in the object 531 at a left end of the object 531.

On the other hand, objects 535, 536 are displayed as input fields and an object 537 is displayed as a button in the subject screen 534, and a cursor 535*a* is displayed in the object 535 at a more central position than a left end of the object 535.

In the subject screen 534, the cursor 535*a* is displayed more centrally than the left end of the object 525, and therefore a number of characters that can be input to the input field is fewer than for the object 531.

This difference in position of cursor in an input field does affect a function provided by the input fields on the screens, and therefore the difference between the reference screen 530 and the subject screen 534 is not permissible.

Thus, an intensity 538 in this case is set to "strong". In this case, a judgment result 539 is "NG".

Figure 20:
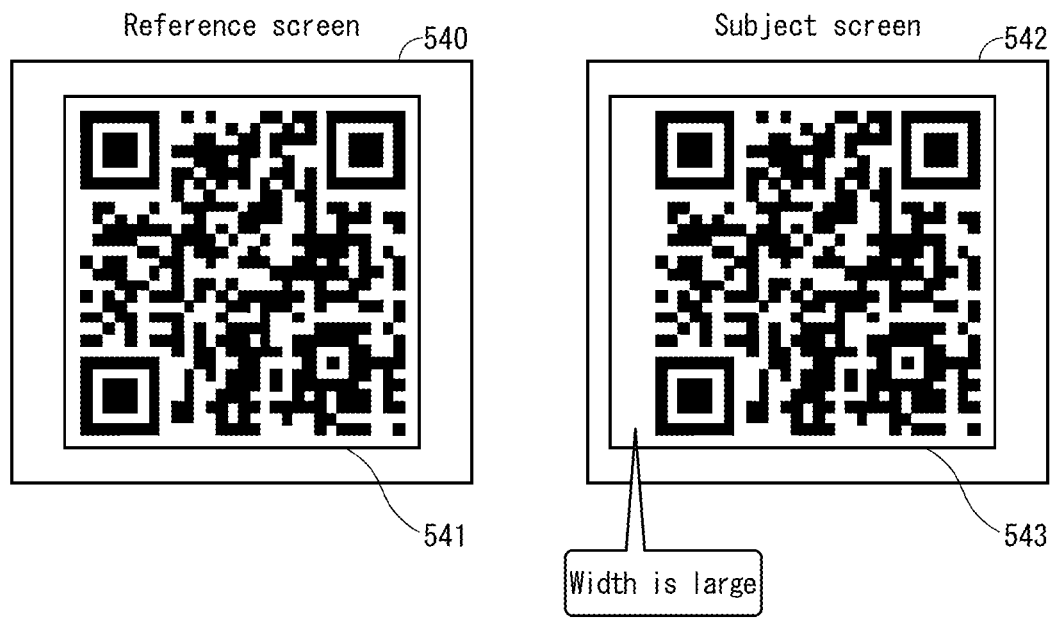
FIG. 20 illustrates a reference screen 540 and a subject screen 542.

(5) As illustrated in FIG. 20, an object 541 is displayed as a display field in a reference screen 540. Here, the object 541 is an optical code.

On the other hand, an object 543 is displayed as a display field in a subject screen 542. Here, the object 543 is also an optical code.

Comparing the reference screen 540 and the subject screen 542, a size of a margin in an image of the optical code in the object 543 is larger than a size of a margin in an image of the optical code in the object 541.

When displaying an optical code, a displacement in display position of the optical code does not cause a problem such as a reading error when reading the optical code. Accordingly, a difference in size of a margin of an optical code positioned in a screen does not affect a function provided by a screen. Thus, the difference between the reference screen 540 and the subject screen 542 is permissible.

Thus, an intensity 548 in this case is set to "weak". In this case, a judgment result 549 is "OK".

Figure 21:
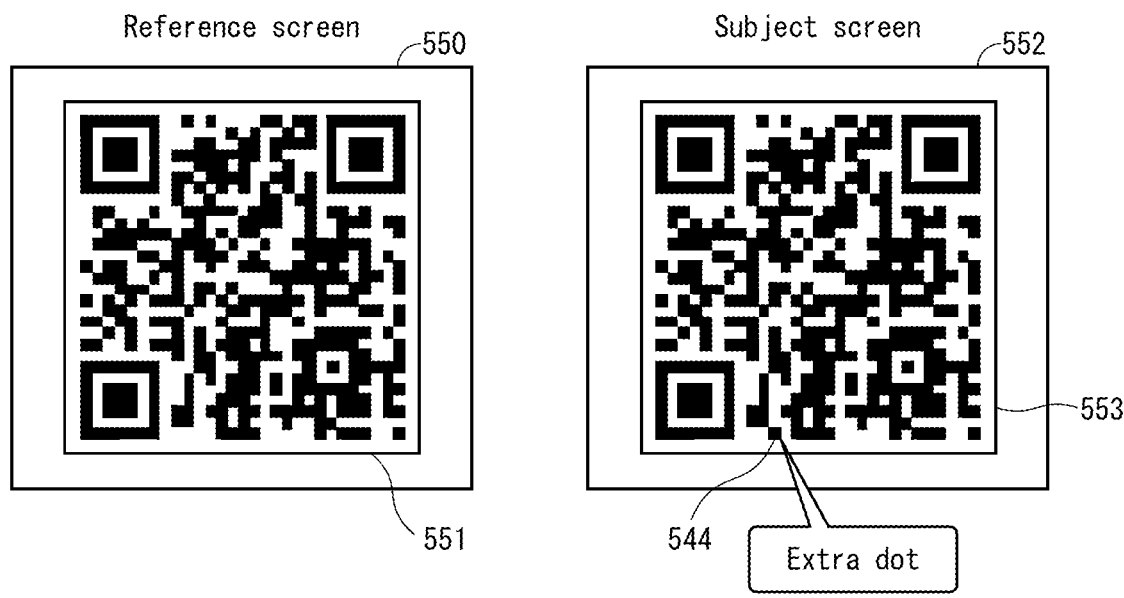
FIG. 21 illustrates a reference screen 550 and a subject screen 552.

(6) As illustrated in FIG. 21, an object 551 is displayed as a display field in a reference screen 550. Here, the object 551 is an optical code.

On the other hand, an object 553 is displayed as a display field in a subject screen 552. Here, the object 553 is also an optical code.

Comparing the reference screen 550 and the subject screen 552, a shape of the optical code in the object 553 is different from a shape of the optical code in the object 551. More specifically, a dot 544 is added to the object 533.

If there is a difference in displayed content of an optical code when displaying the optical code, an error in reading the optical code may occur. This difference in shape of the optical code displayed in a screen does affect a function provided by the screen, and therefore the difference between the reference screen 550 and the subject screen 552 is not permissible.

Thus, an intensity 558 in this case is set to "strong". In this case, a judgment result 559 is "NG".

1.9. Operations of Test System 1

The following describes operations of the test system 1.

(1) Acquisition of Subject Screen Data

Figure 22:
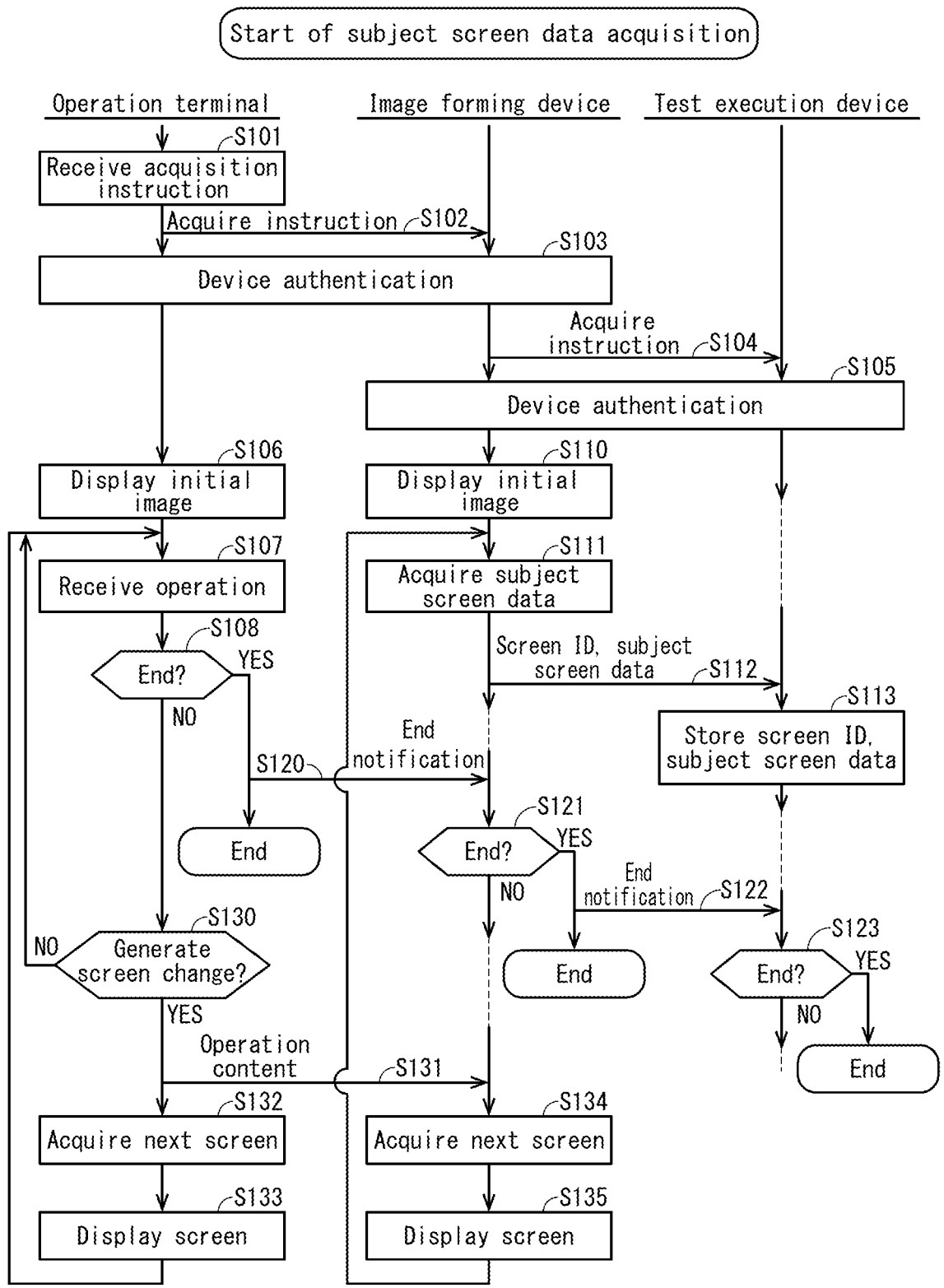
FIG. 22 is a flowchart illustrating subject screen data acquisition operations.

Operations acquiring subject screen data are described with reference to the flowchart illustrated in FIG. 22.

The touch panel 210*a* receives an acquisition instruction from a user indicating acquisition of subject screen data, and outputs the acquisition instruction to the main controller 201 via the input/output controller 209. On receiving an acquisition instruction, the main controller 201 causes the operation terminal 20 to switch from the normal mode to the emulation mode (step S101).

The main controller 201 transmits the acquisition instruction via the wireless communicator 206 and the antenna 203. The antenna 114 and the wireless communicator 113 receive the acquisition instruction, and the wireless communicator 113 outputs the acquisition instruction to the main controller 100. On receiving the acquisition instruction, the main controller 100 causes the image forming device 10 to switch from the normal mode to the emulation mode (step S102).

The main controller 201 and the main controller 100 perform mutual device authentication (step S103). When mutual device authentication is successful, the main controller 100 transmits the acquisition instruction to the test execution device 40 via the network communicator 107 and the LAN 5. The main controller 401 receives the acquisition instruction via the LAN 5 and the communicator 405 (step S104).

The main controller 100 and the main controller 401 perform mutual device authentication (step S105).

In step S103, when mutual device authentication between the main controller 201 and the main controller 100 is successful, the display controller 207 reads a screen template corresponding to a screen to be first displayed in emulation from the storage 202. Next, the display controller 207 generates a first screen using the screen template, and outputs the generated first screen to the remote panel 210 via the input/output controller 209. The touch panel 210a of the remote panel 210 receives the first screen and displays the first screen (step S106).

The remote panel 210 receives a user's operation and outputs content of the received operation to the display controller 207 via the input/output controller 209 (step S107).

The display controller 207 determines whether or not the content of the operation received from the user indicates an end of acquisition of subject screen data (step S108). If the content of the operation received from the user indicates an end of acquisition of subject screen data ("YES" in step S108), the display controller 207 outputs an end notification as control information to the main controller 201. The main controller 201 transmits the end notification via the wireless communicator 206 and the antenna 203. The antenna 114 and the wireless communicator 113 receive the end notification as control information, and the wireless communicator 113 outputs the end notification as control information to the main controller 100 (step S120). Further, the main controller 201 causes the operation terminal 20 to switch from the emulation mode to the normal mode, and ends a process of acquiring subject screen data.

If the content of the operation received from the user does not indicate an end of acquisition of subject screen data ("NO" in step S108), the display controller 207 uses the screen change table 211 to determine whether or not to change screens according to the content of the operation.

If it is determined that no screen change is to occur ("NO" in step S130), the display controller 207 goes to step S107 and repeats.

If it is determined that a screen change occurs ("YES" in step S130), the display controller 207 outputs the received operation content to the main controller 201. The main controller 201 transmits the operation content via the wireless communicator 206 and the antenna 203. The antenna 114 and the wireless communicator 113 receive the operation content, and the wireless communicator 113 outputs the operation content to the main controller 100 (step S131). Further, the display controller 207 reads from the screen change table 211 a destination screen ID identifying a screen to be displayed next according to the operation content. The display controller 207 reads from the storage 202 a screen template identified by the destination screen ID. Next, the display controller 207 generates a screen using the screen template, and outputs the generated screen to the remote panel 210 via the input/output controller 209 (step S132). The touch panel 210a of the remote panel 210 receives and displays the screen (step S133). Next, the display controller 207 goes to step S107 and repeats.

On the other hand, in step S105 when device authentication between the main controller 100 and the main controller 401 succeeds, the display controller 112 reads from the storage 105 a screen template corresponding to a screen to be displayed first in emulation. Next, the display controller 112 generates a first screen using the screen template read, and outputs the generated first screen to the operation panel 19 via the input/output unit 110. The operation panel 19 receives and displays the screen (step S110).

The input/output unit 110 reads subject screen data that is a basis of the currently displayed screen from the VRAM 111, and outputs the read subject screen data to the main controller 100 (step S111). The main controller 100 transmits the subject screen data together with a screen ID identifying a screen represented by the subject screen data to the main controller 401, via the network communicator 107 and the LAN 5. The main controller 401 receives the screen ID and the subject screen data (step S112). The main controller 401 writes the received screen ID and subject screen data to the storage 406 (step S113).

In step S131, when operation content is received, the display controller 112 reads from the screen change table 131 a destination screen ID identifying a screen to be displayed next according to the operation content. The display controller 112 reads from the storage 105 a screen template identified by the destination screen ID. Next, the display controller 112 generates a screen using the screen template read, and outputs the generated screen to the operation panel 19 via the input/output unit 110 (step S134). The operation panel 19 receives and displays the screen (step S135). Next, the display controller 112 goes to step S111 and repeats.

In step S120, on receiving control information, the display controller 112 determines whether or not the control information indicates an end of acquisition of subject screen data (step S121). When the control information indicates an end of acquisition of subject screen data ("YES" in step S121), the display controller 112 outputs an end notification to the main controller 100 as control information. The main controller 100 outputs the end notification as control information to the main controller 401 via the network communicator 107, the LAN 5, and the communicator 405 (step S122). Further, the main controller 100 causes the image forming device 10 to switch from the emulation mode to the normal mode, and ends a process of acquiring subject screen data.

When the control information does not indicate an end of acquisition of subject screen data ("NO" in step S121), the display controller 112 continues processing.

The main controller 401 determines whether or not the control information received from the image forming device 10 is an end notification (step S123). On determining that the control information is an end notification ("YES" in step S123), the main controller 401 ends acquisition of subject screen data.

On determining that the control information is not an end notification ("NO" in step S123), the main controller 401 continues processing.

This concludes the explanation of acquisition of subject screen data.

(2) Setting Judgment Criteria

Figure 23:
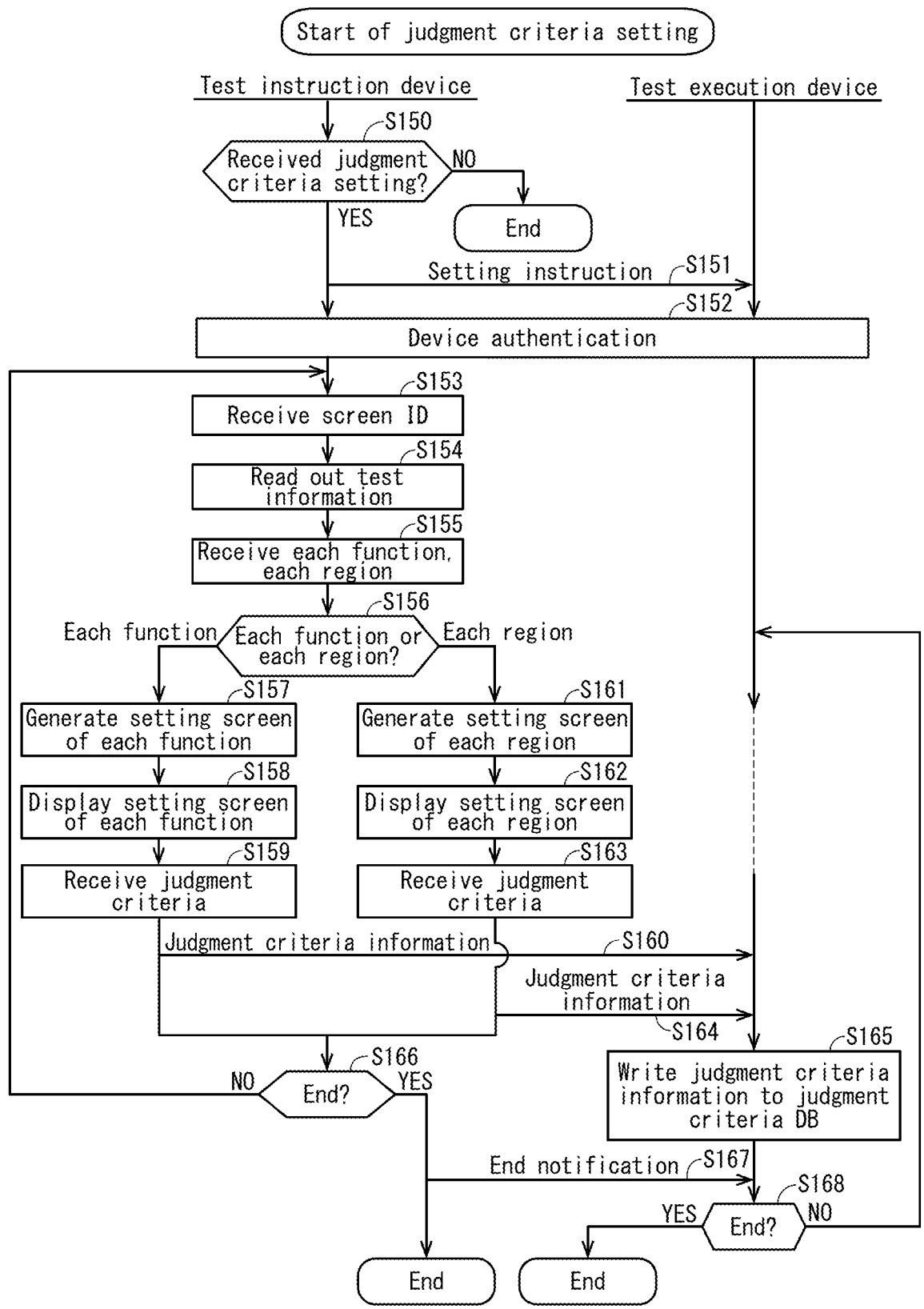
FIG. 23 is a flowchart illustrating judgment criteria setting operations.

Operations setting judgment criteria are described with reference to the flowchart illustrated in FIG. 23.

The main controller 301 determines whether or not an instruction for setting a judgment criterion has been received from a user via the input unit 302 (step S150). On determining that a setting instruction has not been received ("NO" in step S150), the main controller 301 does not execute judgment criterion setting.

On determining that setting instruction has been received ("YES" in step S150), the main controller 301 transmits the judgment criterion setting instruction to the test execution device 40 (step S151). Next, the main controller 301 and the main controller 401 perform mutual device authentication (step S152). When mutual device authentication is successful, the input unit 302 receives from a user a screen ID identifying a screen for which a judgment criterion is to be set, and the main controller 301 receives the screen ID from the input unit 302 (step S153).

Next, the main controller 301 reads test information including the received screen ID from the test case DB 311 stored in the storage 306 (step S154).

Next, the input unit 302 receives from the user a setting method indicating whether to set a determination criterion for each function or each region, and the main controller 301 receives the setting method from the input unit 302 (step S155).

The main controller 301 determines whether the received setting method indicates a setting for each function or for each region (step S156).

On determining that the received setting method indicates a setting for each function ("each function" in step S156), the display controller 304 generates a setting screen for each function by using test information read, and outputs the setting screen to the monitor 32 via the output unit 303 (step S157). The monitor 32 displays the setting screen for each function (step S158). The input unit 302 receives a judgment criterion from the user via the setting screen for each function and the keyboard 33. The main controller 301 receives the judgment criterion from the input unit 302, and temporarily writes the judgment criteria information 321 including the received judgment criterion to the storage 306 (step S159). Next, the main controller 301 reads the judgment criteria information 321 from the storage 306, and transmits the judgment criteria information 321 to the test execution device 40 via the communicator 305 and the LAN 5. The main controller 401 receives the judgment criteria information from the test instruction device 30 via the LAN 5 and the communicator 405 (step S160). The main controller 401 writes the received judgment criteria information to the judgment criteria DB 431 stored in the storage 406 (step S165).

In this way, the communicator 405 receives the judgment criteria for each function included in a reference screen.

On the other hand, on determining that the received setting method indicates a setting for each region ("each region" in step S156), the display controller 304 generates a setting screen for each region by using test information read, and outputs the setting screen to the monitor 32 via the output unit 303 (step S161). The monitor 32 displays the setting screen for each region (step S162). The input unit 302 receives a judgment criterion from the user via the setting screen for each region and the keyboard 33. The main controller 301 receives the judgment criterion from the input unit 302, and temporarily writes the judgment criteria information 321 including the received judgment criterion to the storage 306 (step S163). Next, the main controller 301 reads the judgment criteria information 321 from the storage 306, and transmits the judgment criteria information 321 to the test execution device 40 via the communicator 305 and the LAN 5. The main controller 401 receives the judgment criteria information from the test instruction device 30 via the LAN 5 and the communicator 405 (step S164). The main controller 401 writes the received judgment criteria information to the judgment criteria DB 431 stored in the storage 406 (step S165).

In this way, the communicator 405 receives the judgment criteria for each region of a reference screen.

The main controller 301 determines whether or not an instruction indicating an end of setting judgment criteria has been received from a user via the input unit 302 (step S166). On determining that that an instruction indicating an end of setting judgment criteria has not been received ("NO" in step S166), the main controller 301 goes to step S153 and repeats.

On determining that an instruction indicating an end of setting judgment criteria has been received ("YES" in step S166), the main controller 301 transmits an end notification indicating an end of setting judgment criteria as control information to the test execution device 40 via the communicator 305 and the LAN 5 (step S167), and judgment criteria processing ends.

The main controller 401 receives the control information from the test instruction device 30 via the LAN 5 and the communicator 405 (step S167). The main controller 401 determines whether or not the received control information is an end notification (step S168). On determining that the control information is not an end notification ("NO" in step S168), the main controller 401 waits to receive a judgment criterion from the test instruction device 30.

On determining that the control information is an end notification ("YES" in step S168), the main controller 401 ends judgment criteria setting.

This concludes the explanation of judgment criteria setting.

(3) Overall Test Operation

An overall test operation is described with reference to the flowchart illustrated in FIG. 24.

The input unit 302 receives a test start instruction from a user, and the main controller 301 receives the start instruction from the input unit 302 (step S181). Next, the main controller 301 transmits the test start instruction to the test execution device 40 via the communicator 305 and the LAN 5. The main controller 401 receives the test start instruction from the test instruction device 30 via the LAN 5 and the communicator 405 (step S182).

The main controller 301 and the main controller 401 perform mutual device authentication (step S183). When the mutual device authentication is successful, the main controller 401 determines whether or not reading of test information from the test case DB 421 is complete (step S184).

On determining that reading of test information has not ended ("NO" in step S184), the main controller 401 reads test information from the test case DB 421 (step S185). Next, the main controller 401 reads from the storage 406 the reference screen data 461 identified by the screen ID included in the test information (step S186), and reads from the storage 406 the subject screen data 471 identified by the screen ID (step S187). Next, the main controller 401 reads judgement criteria information identified by the screen ID from the judgment criteria DB 431 (step S188). Next, the main controller 401 controls the test executor 402 to execute a screen test, and the test executor 402 executes the screen test (step S189). Next, the main controller 401 writes judgment results from the test executor 402 to the evaluation results DB 441, and writes log information to the storage 406 (step S190). Next, the main controller 401 goes to step S184 and repeats.

On determining that reading of test information from the test case DB 421 is complete ("YES" in step S184), the main controller 401 transmits an end notification indicating an end of testing to the test instruction device 30 via the communicator 405 and the LAN 5. The main controller 301 receives the end notification from the test execution device 40 via the LAN 5 and the communicator 305 (step S191).

The main controller 301 outputs the end notification to the output unit 303, causing the monitor 32 to display an end of testing. The monitor 32 displays the test end (step S192).

The main controller 401 transmits a completion notification indicating test completion to the test instruction device 30, the main controller 301 causes the monitor 32 to display completion of testing, and then the test instruction device 30 and the test execution device 40 execute feedback processing (step S193).

This concludes the explanation of the overall testing process.

(4) Testing Per Screen

Figure 25:
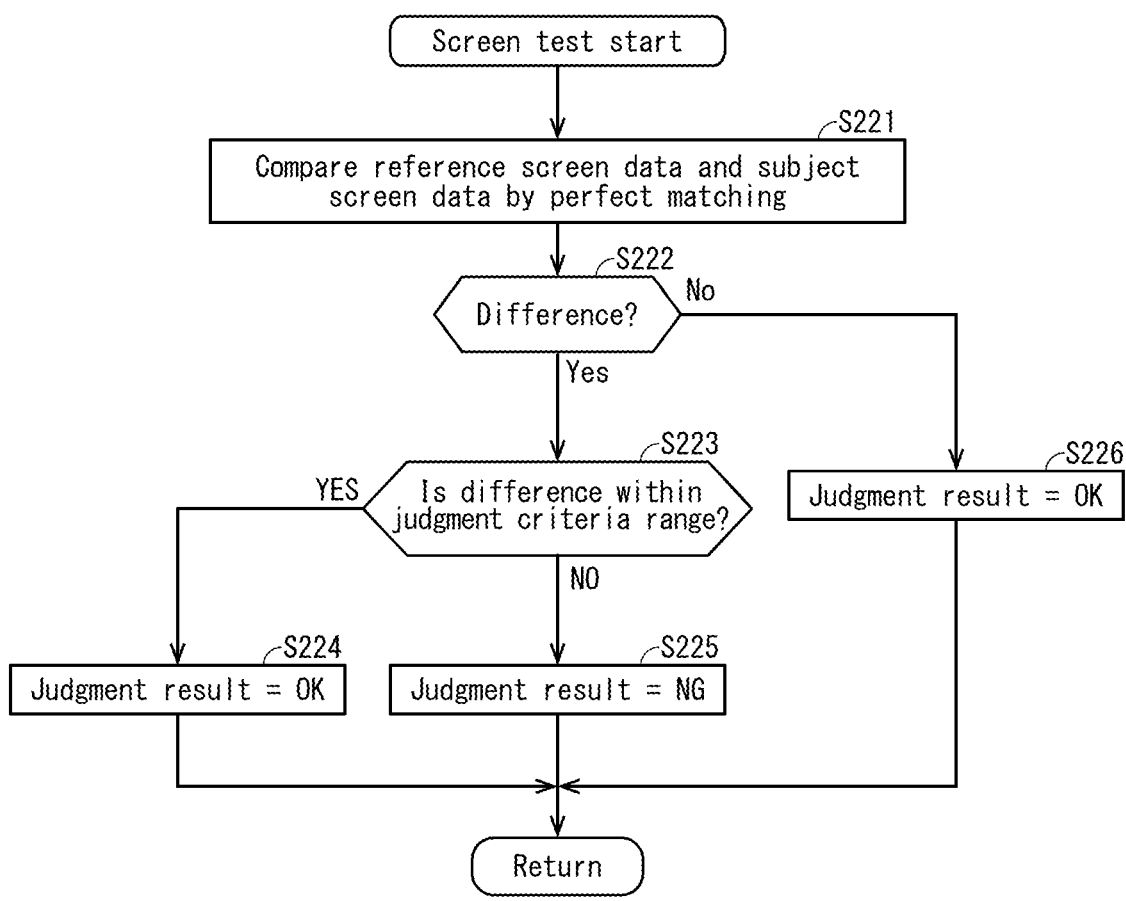
FIG. 25 is a flowchart illustrating screen test operations.

Testing per screen is described with reference to the flowchart illustrated in FIG. 25.

Figure 24:
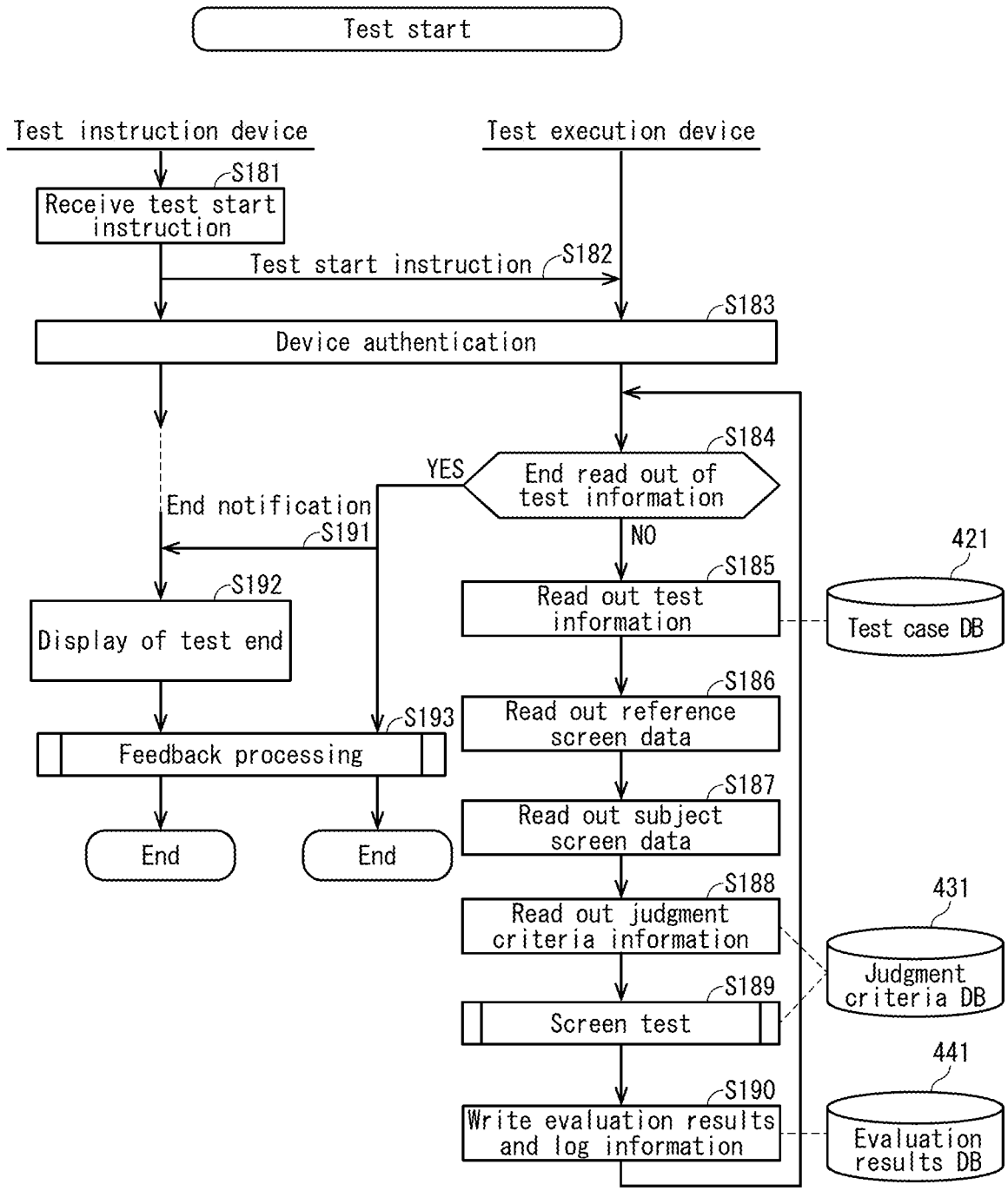
FIG. 24 is a flowchart illustrating overall test operations.

The operation described here is a detailed explanation of step S189 in the flowchart illustrated in FIG. 24.

The detection unit 402a compares reference screen data and subject screen data by perfect matching (step S221).

When there is no difference between the reference screen data and the subject screen data ("NO" in step S222), the detection unit 402a sets a judgment result to "OK" (step S226).

When there is a difference between the reference screen data and the subject screen data ("YES" in step S222), the judgment unit 402b determines whether or not the difference is within a judgment criteria range (step S223). When the difference is within a judgment criteria range ("YES" in step S223), the judgment unit 402b sets a judgment result to "OK" (step S224). On the other hand, when the difference is not within a judgment criteria range ("NO" in step S223), the judgment unit 402b sets a judgment result to "NG" (step S225).

This concludes the explanation of testing per screen.

(5) Feedback Processing

Figure 26:
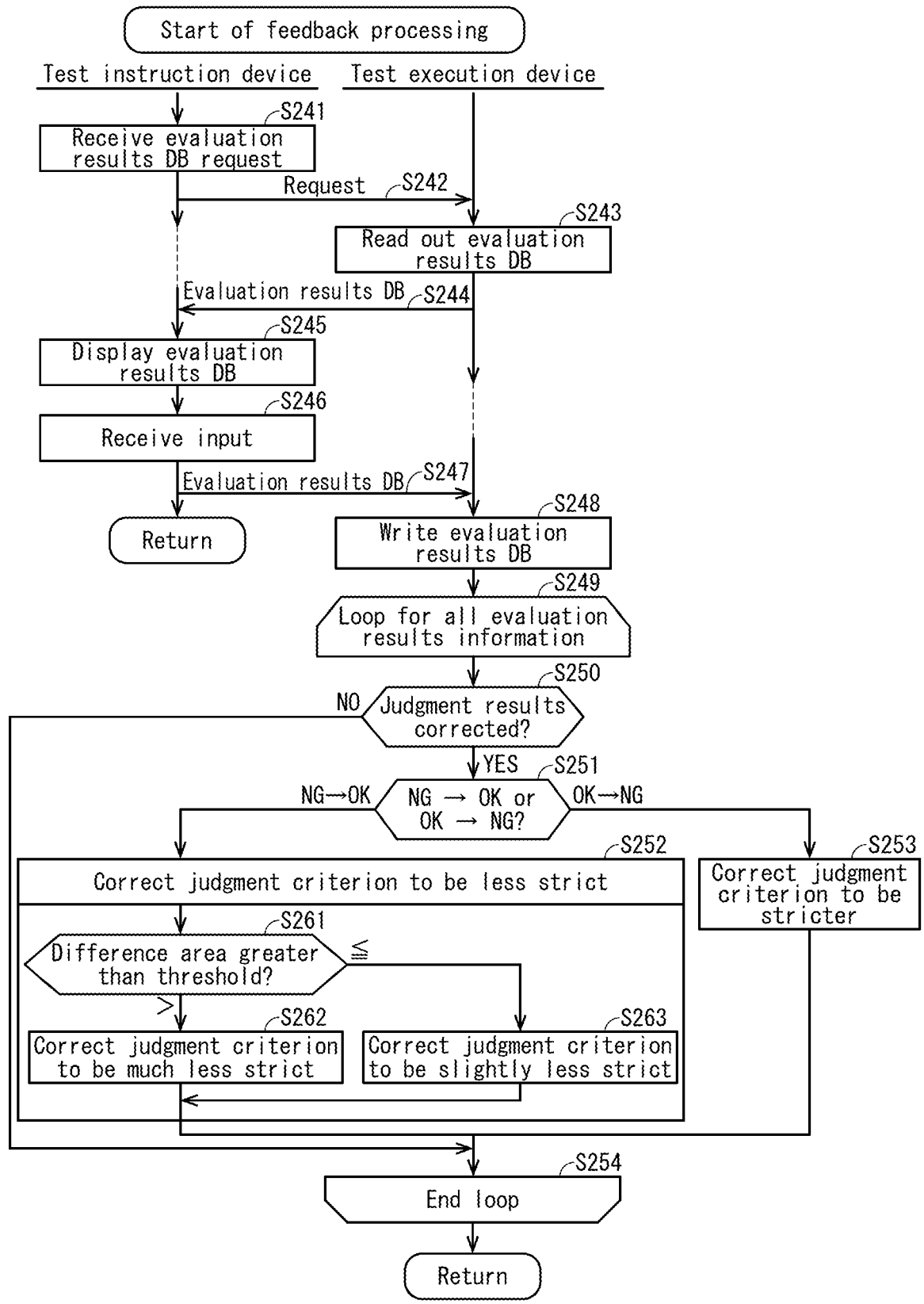
FIG. 26 is a flowchart illustrating feedback processing operations.

Feedback processing is described with reference to the flowchart illustrated in FIG. 26.

The operation described here is a detailed explanation of step S193 in the flowchart illustrated in FIG. 24.

The input unit 302 receives an evaluation results DB transmission request from a user, and the main controller 301 receives the transmission request (step S241). The main controller 301 transmits the request to the test execution device 40 via the communicator 305 and the LAN 5. The main controller 401 receives the request from the test instruction device 30 via the LAN 5 and the communicator 405 (step S242).

The main controller 401 reads the evaluation results DB 441 from the storage 406 (step S243). Next, the main controller 401 transmits the evaluation results DB to the test instruction device 30 via the communicator 405 and the LAN 5. The main controller 301 receives the evaluation results DB from the test execution device 40 via the LAN 5 and the communicator 305, and writes the evaluation results DB to the storage 306 as the evaluation results DB 331 (step S244).

The main controller 301 instructs the display controller 304 to generate a screen to display the evaluation results DB. The monitor 32 displays the evaluation results DB (step S245).

The input unit 302 receives an evaluation result from the user for each judgment result in the evaluation results DB, and the main controller 301 writes the received evaluation results to the evaluation results DB (step S246).

Next, the main controller 301 reads from the storage 306 the evaluation results DB 331 in which the evaluation results are written, and transmits the evaluation results DB to the test execution device 40 via the communicator 305 and the LAN 5. The main controller 401 receives the evaluation results DB from the test instruction device 30 via the LAN 5 and the communicator 405 (step S247). The main controller 401 writes the received evaluation results DB to the storage 406 (step S248).

The feedback processor 403 repeats steps S250, S251, S252, S253 described below for all evaluation result information in the evaluation results DB written in the storage 406 (steps S249 to S254).

The feedback processor 403 determines whether or not a judgment result has been corrected (step S250). When it is determined that a judgment result has been corrected ("YES" in step S250), the feedback processor 403 determines whether the correction corrected the judgment result from "NG" to "OK" or from "OK" to "NG" (step S251).

On determining that the correction was from "NG" to "OK" ("NG→OK" in step S251), the feedback processor 403 corrects a judgment criterion in the judgment criteria DB 431 to be less strict (step S252).

In step S252, the feedback processor 403 compares difference area to a threshold value (step S261). On determining that the difference area is greater than the threshold value ("≥" in step S261), the feedback processor 403 corrects the judgment criterion in the judgment criteria DB 431 to be much less strict (step S262). On determining that the difference area is less than or equal to the threshold value ("<" in step S261), the feedback processor 403 corrects the judgment criterion in the judgment criteria DB 431 to be slightly less strict (step S263).

On determining that the correction was from "OK" to "NG" ("OK→NG" in step S251), the feedback processor 403 corrects a judgment criterion in the judgment criteria DB 431 to be stricter (step S253).

On determining that no correction of judgment result occurred ("NO" in step S250), the feedback processor 403 does not execute further processing.

This concludes description of the feedback processing.

Thus, through judgment criteria correction processing, the judgment criteria are corrected to appropriate values in view of a user's evaluation.

1.10. Review

As described above, according to an embodiment, a difference is detected between corresponding position in subject screen data and reference screen data read from the storage 406, whether or not the detected difference is permissible is judged according to a judgment criterion, and because eligibility of subject screen data is determined it is also made possible that, for example, a difference that is not a problem from a user's viewpoint is set to not be considered significant. As a result, the outstanding effect is achieved of making it possible to reduce the man-hours required for confirming whether or not a detected difference makes an image ineligible.

2. Modifications

Description has been based on an embodiment described above, but the present disclosure is not limited to the above embodiment, and includes the following modifications.

(1) According to an embodiment described above, judgment criteria (intensity) are set at three levels: "strong", "medium", and "weak", but judgment criteria are not limited to this example.

Judgment criteria may be set at two levels: "strong" and "weak", or more than three levels.

(2) As illustrated in FIG. 8, when one screen is composed of three regions, judgment criteria are set for each region, but region and judgment criteria correspondence is not limited to this example.

When a screen is composed of only one region, one judgment criterion may be set for one screen. In other words, the communicator 405 (reception unit) may receive judgment criteria for an entirety of a reference screen.

Further, when one screen is composed of a plurality of regions, one judgment criterion may be set for some of the plurality of regions, and one judgment criterion may be set for each function provided in another region.

(3) According to an embodiment described above, the image forming device 10 changes a screen displayed on the operation panel 19 according to a remote operation on the operation terminal 20, and the screen displayed on the operation panel 19 is output as subject screen data to the test execution device 40, but the present disclosure is not limited to this example.

The test system may include the image forming device 10, the test instruction device 30, and the test execution device 40, without the operation terminal 20. In this case, the image forming device 10 changes a screen displayed on the operation panel 19 according to a user operation on the operation panel 19, and the screen displayed on the operation panel 19 is output to the test execution device 40 as subject screen data. Further, in this case, the image forming device 10 may execute a job such as a print job or copy job.

(4) According to an embodiment described above, the storage 306 of the test instruction device 30 stores a test case DB, and the storage 406 of the test execution device 40 stores a test case DB and reference screen data, but the present disclosure is not limited to this example.

The LAN 5 may be connected to a first personal computer (PC) used by a developer who designs and develops the image forming device 10 and a second PC used by a tester who creates a test case.

The developer may create reference screen data using the first PC and store the reference screen data in the first PC. The first PC transmits the reference screen data to the test execution device 40 via the LAN 5 according to an instruction from the developer. The communicator 405 of the test execution device 40 receives reference screen data from the first PC via the LAN 5, and the input/output unit 404 writes the received reference screen data to the storage 406.

The tester may create a test case DB using the second PC and store the test case DB in the second PC. The second PC transmits the test case DB to the test execution device 40 via the LAN 5 according to an instruction from the tester. The communicator 405 of the test execution device 40 receives the test case DB from the second PC via the LAN 5, and the input/output unit 404 writes the received test case DB to the storage 406. The second PC transmits the test case DB to the test instruction device 30 via the LAN 5 according to an instruction from the tester. The communicator 305 of the test instruction device 30 receives the test case DB from the second PC via the LAN 5, and the main controller 301 writes the received test case DB to the storage 306.

(5) According to an embodiment described above, the test system 1 includes the image forming device 10 that forms images by electrophotography as a test target, but the present disclosure is not limited to this example. The test system 1 may include a printing device that performs printing by an inkjet method instead of the image forming device 10.

Further, the test target is not limited to an electrophotographic image forming device or inkjet printing device.

It suffices that a screen for a user to operate is displayed on a display device to accept a user operation on an electronic device. In such a case, the electronic device may include the display device integrally, or the electronic device and the display device may be connected by a cable or the like.

An example is a digital broadcast transmission and reception, recording, playback system including recording/playback device that receives a digital broadcast of video and audio, records and plays back the received digital broadcast, and a monitor device connected to the recording/playback device by a cable, that receives and outputs audio and video from the recording/playback device.

(6) According to an embodiment described above, as illustrated in the flowchart of FIG. 23, input of judgment criteria for each function or region is requested from a user of the test instruction device 30, but the present disclosure is not limited to this example.

For example, an intensity "strong" may be set as a default value for all judgment criteria without requiring a user of the test instruction device 30 to input judgment criteria for each function or region.

In this case, the test execution device 40 executes a test using the judgment criteria with intensity set to "strong", the judgment results are evaluated by a user, the test execution device 40 executes feedback processing using evaluation results, and the judgment criteria are amended to appropriate values.

(7) Judgment by the test execution device, evaluation by a user, and feedback processing may be performed repeatedly. Through this repetition, judgment criteria may be corrected to more appropriate values according to a user.

(8) According to an embodiment described above, the reference screen data stored in the storage 406 of the test execution device 40 and the subject screen data have the same number of vertical and horizontal pixels as each other, but the present disclosure is not limited to this example.

The number of vertical and horizontal pixels in the reference screen data and the subject screen data need not be the same. In this case, the subject screen data may be converted so that the number of vertical and horizontal pixels in the subject screen data becomes the same as the number of vertical and horizontal pixels in the reference screen data.

(9) As described above, the operation terminal, the image forming device, the test instruction device, and the test execution device are each a computer system including a microprocessor and a memory. The memory may store a computer program, and the microprocessor may operate according to the computer program.

The microprocessor includes a fetch unit, a decoding unit, an execution unit, a register file, an instruction counter, and the like. The fetch unit reads out each instruction code included in a computer program one by one from the computer program stored in the memory. The decoding unit decodes instruction codes that are read out. The execution unit executes operations according to decoding results. In this way, the microprocessor operates according to the computer program stored in the memory.

Here, a computer program combines a plurality of instruction codes indicating instructions for a computer to achieve a defined function.

Further, a computer program may be recorded on a non-volatile computer-readable recording medium such as a flexible disk, a hard disk, an optical disk, or a semiconductor memory.

Further, a computer program may be transmitted by wired or wireless telecommunication lines, a network such as the Internet, data broadcasting, or the like.

(10) Any embodiment described above and any modification may be combined.

Although one or more embodiments of the present invention have been described and illustrated in detail, the disclosed embodiments are made for the purposes of illustration and example only and not limitation. The scope of the present invention should be interpreted by the terms of the appended claims

What is claimed is:

1. An inspection device that inspects eligibility of a subject image, the inspection device comprising:
    a hardware processor and a non-transitory computer-readable recording medium comprising computer-executable instructions that when executed by the hardware processor are configured to cause the inspection device to:
    acquire the subject image and a reference image corresponding to the subject image;
    acquire a judgment criterion indicating a range of eligibility for differences between images, wherein the judgment criterion indicates, as the range of eligibility, a total number of positions in which the difference is detected in a range equal to or less than a threshold value;
    detect a difference between the subject image and the reference image;
    calculate the total number of positions in which the difference is detected; and
    when the difference is detected, judge eligibility of the subject image by determining whether or not the difference is included in the range indicated by the judgment criterion, and whether or not the calculated total number is equal to or less than the threshold value.

2. The inspection device of claim 1, wherein
the subject image is an image displayed by an electronic device to guide a user operating the electronic device.

3. The inspection device of claim 2, wherein
the reference image includes a notification item for notifying the user of a function of the electronic device; and
the judgment criterion is acquired for the notification item included in the reference image.

4. The inspection device of claim 2, wherein
the reference image includes a region including a notification item for notifying the user of a function of the electronic device; and
the judgment criterion is acquired for the region of the reference image or for an entirety of the reference image.

5. The inspection device of claim 2, wherein
the electronic device is an image forming device.

6. The inspection device of claim 1, wherein
the judgment criterion indicates, as the range of eligibility, an area in which the difference is detected in a range equal to or less than a threshold value,
the instructions further cause the inspection device to calculate the area in which the difference is detected, and
judge whether or not the calculated area is equal to or less than the threshold value.

7. The inspection device of claim 1, wherein the instructions further cause the inspection device to:
    output a judgment result indicating whether or not the subject image is eligible;
    acquire an evaluation result from a user indicating whether or not the subject image is eligible in response to the judgment result; and
    correct the judgment criterion according to a combination of the judgment result and the evaluation result.

8. The inspection device of claim 7, wherein
the instructions further cause the inspection device to determine whether or not the judgment result and the evaluation result are different, and
when the judgment result indicates that the subject image is ineligible and the evaluation result indicates that the subject image is eligible, correct the judgment criterion to indicate a second range of eligibility broader than the range previously indicated.

9. The inspection device of claim 8, wherein
the judgment criterion indicates, as the range of eligibility, an area in which the difference is detected as a range equal to or less than a threshold value,
the instructions further cause the inspection device to calculate the area in which the difference is detected,
    judge whether or not the calculated area is equal to or less than the threshold value, and
    when the area is larger than the threshold value, correct the range indicated by the judgment criterion to a second range broader by a first extension range than the range previously indicated, wherein
the first extension range is broader than an extension range threshold.

10. The inspection device of claim 9, wherein
the instructions further cause the inspection device to, when the area is smaller than or equal to the threshold value, correct the range indicated by the judgment criterion to the second range broader by a second extension range than the range previously indicated, wherein
the second extension range is narrower than the extension range threshold.

11. The inspection device of claim 7, wherein
the instructions further cause the inspection device to determine whether or not the judgment result and the evaluation result are different, and
when the judgment result indicates that the subject image is eligible and the evaluation result indicates that the subject image is ineligible, correct the judgment criterion to indicate a second range of eligibility narrower than the range previously indicated.

12. A inspection method used by an inspection device to inspect eligibility of a subject image, the method comprising:
    acquiring the subject image and a reference image corresponding to the subject image;

acquiring a judgment criterion indicating a range of eligibility for differences between images, wherein the judgment criterion indicates, as the range of eligibility, a total number of positions in which the difference is detected in a range equal to or less than a threshold value;

detecting a difference between the subject image and the reference image;

calculating the total number of positions in which the difference is detected; and when the difference is detected, judging eligibility of the subject image by determining whether or not the difference is included in the range indicated by the judgment criterion, and whether or not the calculated total number is equal to or less than the threshold value.

13. A non-transitory computer-readable recording medium storing thereon computer-executable instructions of a computer program for inspecting eligibility of a subject image, wherein the instructions include:

acquiring the subject image and a reference image corresponding to the subject image, wherein the judgment criterion indicates, as the range of eligibility, a total number of positions in which the difference is detected in a range equal to or less than a threshold value;

acquiring a judgment criterion indicating a range of eligibility for differences between images;

detecting a difference between the subject image and the reference image;

calculating the total number of positions in which the difference is detected; and when the difference is detected, judging eligibility of the subject image by determining whether or not the difference is included in the range indicated by the judgment criterion, and whether or not the calculated total number is equal to or less than the threshold value.

* * * * *